US012477616B2

(12) United States Patent
Ozturk et al.

(10) Patent No.: US 12,477,616 B2
(45) Date of Patent: Nov. 18, 2025

(54) USER EQUIPMENT CONTEXT RETRIEVAL IN RADIO RESOURCE CONTROL INACTIVE STATE

(71) Applicant: Nokia Technologies Oy, Espoo (FI)

(72) Inventors: Ece Ozturk, Munich (DE); Subramanya Chandrashekar, Bangalore (IN); Ömer Bulakci, Munich (DE); Devaki Chandramouli, Dallas, TX (US)

(73) Assignee: Nokia Technologies Oy, Espoo (FI)

( * ) Notice: Subject to any disclaimer, the term of this patent is extended or adjusted under 35 U.S.C. 154(b) by 371 days.

(21) Appl. No.: 18/321,409

(22) Filed: May 22, 2023

(65) Prior Publication Data

US 2023/0403756 A1    Dec. 14, 2023

(30) Foreign Application Priority Data

Jun. 14, 2022    (IN) .............................. 202241034022

(51) Int. Cl.
*H04W 76/27* (2018.01)
*H04W 76/30* (2018.01)

(52) U.S. Cl.
CPC ........... *H04W 76/27* (2018.02); *H04W 76/30* (2018.02)

(58) Field of Classification Search
CPC ...... H04W 76/27; H04W 76/30; H04W 76/19
See application file for complete search history.

(56) References Cited

U.S. PATENT DOCUMENTS

| 11,234,287 | B2 | 1/2022 | Patil et al. |
| 2019/0320488 | A1* | 10/2019 | Mildh .................... H04W 76/30 |
| 2020/0214070 | A1* | 7/2020 | Ingale ................. H04W 12/106 |

(Continued)

FOREIGN PATENT DOCUMENTS

| GB | 2434054 A | 7/2007 |
| WO | 2019/033278 A1 | 2/2019 |

(Continued)

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.0.0, Mar. 2022, pp. 1-204.

(Continued)

*Primary Examiner* — Will W Lin
(74) *Attorney, Agent, or Firm* — McCarter & English LLP

(57) ABSTRACT

Techniques are provided for enabling user equipment (UE) context retrieval in radio resource control RRC inactive status with a shared radio access network (RAN) database (DB) within a distributed database architecture. A version indicator in an inactive Radio Network Temporary Identifier (I-RNTI) is populated by the UE to indicate one or more I-RNTI versions, defined herein, and indicates the type of data in the remainder of the I-RNTI used for communicating the location of a RAN DB that stores the UE context, to a target network node. The target network node then uses the data in the I-RNTI, further dependent on the I-RNTI version, to retrieve the UE content from the RAN database. Certain embodiments utilize a RAN DB Area (RDBA) and/or RAN DB Set Area (RDSA), and certain embodiments utilize a network node set ID.

20 Claims, 9 Drawing Sheets

(56) References Cited

U.S. PATENT DOCUMENTS

| | | | |
|---|---|---|---|
| 2021/0185570 A1* | 6/2021 | Faxén | H04W 76/19 |
| 2021/0307100 A1* | 9/2021 | Talebi Fard | H04W 76/18 |
| 2022/0022247 A1 | 1/2022 | Agiwal et al. | |
| 2022/0046576 A1* | 2/2022 | Lauridsen | H04W 76/30 |
| 2022/0174760 A1* | 6/2022 | Xu | H04W 76/30 |
| 2023/0007472 A1* | 1/2023 | Li | H04W 12/033 |
| 2023/0032390 A1 | 2/2023 | Chandramouli et al. | |
| 2023/0262815 A1* | 8/2023 | Agiwal | H04W 72/1268 |
| 2024/0015503 A1* | 1/2024 | Torabian Esfahani | H04W 12/037 |
| 2024/0276583 A1* | 8/2024 | Xu | H04W 36/087 |
| 2024/0314558 A1* | 9/2024 | Orsino | H04W 12/106 |

FOREIGN PATENT DOCUMENTS

| | | |
|---|---|---|
| WO | 2020/056433 A2 | 3/2020 |
| WO | 2020/178622 A1 | 9/2020 |
| WO | 2021/162597 A1 | 8/2021 |
| WO | 2023/001353 A1 | 1/2023 |
| WO | 2023/001683 A1 | 1/2023 |

OTHER PUBLICATIONS

"Node Identifier for RRC Inactive", 3GPP TSG-RAN WG3 Meeting #112-e, R3-212310, Agenda: 31.2.1. Ericsson, May 17-27, 2021, 12 pages.

"Discussion on I-RNTI partitioning", 3GPP TSG-RAN WG3 #113-e, R3-213247, Agenda: 31.2.1, ZTE Corporation, Aug. 16-26, 2021, 4 pages.

"Discussion the remaining issue on I-RNTI partitioning", 3GPP TSG-RAN WG3 #115e, R3-221790, Agenda: 31.2.1, ZTE, Feb. 21-Mar. 3, 2022, 3 pages.

"3rd Generation Partnership Project; Technical Specification Group Radio Access Network; NG-RAN; NG Application Protocol (NGAP) (Release 17)", 3GPP TS 38.413, V17.0.0, Apr. 2022, pp. 1-561.

"Msc-generator", Sourceforge, Retrieved on Jun. 16, 2023, Webpage available at : https://sourceforge.net/projects/msc-generator/.

"3rd Generation Partnership Project; Technical Specification Group Services and System Aspects; System architecture for the 5G System (5GS); Stage 2 (Release 17)", 3GPP TS 23.501, V17.4.0, Mar. 2022, pp. 1-567.

"3rd Generation Partnership Project; Technical Specification Group Radio Access Network; NR; Radio Resource Control (RRC) protocol specification (Release 16)", 3GPP TS 38.331, V16.8.0, Mar. 2022, pp. 1-964.

"5G NR: UE RRC States and State Transitions", How LTE Stuff Works?, Retrieved on Jun. 16, 2023, Webpage available at : http://howltestuffworks.blogspot.com/2019/09/5g-nr-ue-rrc-states-and-state.html.

Extended European Search Report received for corresponding European Patent Application No. 23176586.8, dated Nov. 20, 2023, 10 pages.

"EUTRA connected to 5GC: clause 6.8.2", 3GPP TSG-SA WG3 Meeting #94, S3-190259, Ericsson, Jan. 28-Feb. 1, 2019, 4 pages.

* cited by examiner

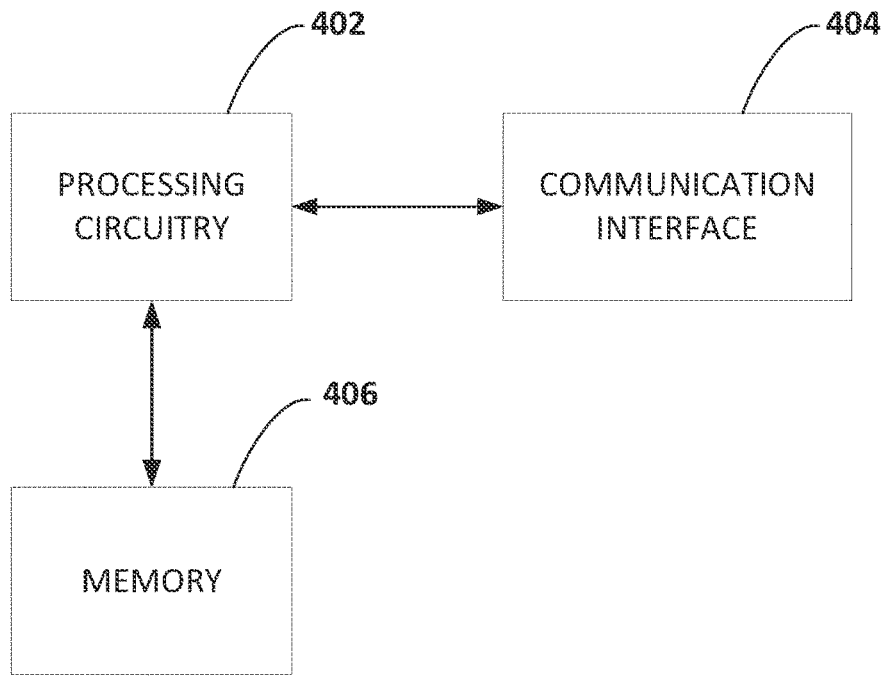

FIG. 4

Transmit a connection release message toward a user equipment (UE), the connection release message comprising one or more inactive radio network temporary identifier (I-RNTI) versions associated with at least one of a source radio access network database area (RDBA) or a source radio access network set area (RDSA) — 500

Store a UE context in association with one or more unique identifiers comprising an I-RNTI or a portion thereof in a source RAN DB identified by an assigned RAN DB identifier (ID) — 504

FIG. 5

USER EQUIPMENT CONTEXT RETRIEVAL IN RADIO RESOURCE CONTROL INACTIVE STATE

RELATED APPLICATION

This application claims priority to IN Provisional Application No. 202241034022 filed Jun. 14, 2022 which is incorporated herein by reference in its entirety.

TECHNOLOGICAL FIELD

An example embodiment relates generally to wireless communications and, more particularly, but not exclusively, to retrieval of user equipment (UE) context in the radio resource control (RRC) inactive state.

BACKGROUND

Fifth generation (5G) technology was designed to provide high download speeds, low latency, and improved capacity and connectivity, and is intended to be used not only for human interaction, but also for machine type communications in Internet of Things (IoT) networks, virtual reality environments, artificial intelligence implementations, and/or the like. Next generation mobile and wireless communication networks, i.e., sixth generation (6G), aim at further improving network performance relative to 5G technology, e.g., to increase data rates, to reduce latency, and to provide high yield increased processing speeds.

BRIEF SUMMARY

As depicted in FIG. 1, 5G allows two connection management states, connection management CM-IDLE state 100 and CM-CONNECTED state 102. Radio resource control (RRC) specifications state RRC_CONNECTED state 104 and RRC_INACTIVE state 106 belong to the CM-CONNECTED state, while RRC_IDLE state 108 is part of the CM-IDLE state. There is an inherent benefit of having a UE being kept in CM-CONNECTED state (even when there is no data being transmitted), as both the UE and next generation node B (gNB) keep necessary configurations and information exchanged. This can reduce signaling between the UE and the network significantly, as well as allow a UE to have little delay incurred when it needs to transmit and/or receive data. These are enhancements that were introduced with 5G, with the "dormant" state referred to RRC_INACTIVE state in Third Generation Partnership Project (3GPP) Technical specification (TS) 38.300. While the UE is in RRC_INACTIVE state, the corresponding UE context is kept within a radio access network (RAN) by the last serving gNB. The UE can move within an area configured by RAN, i.e., RAN-based notification area (RNA), without notifying RAN. The RNA is configured by the network per UE and can cover a single or multiple cells, and shall be contained within the core network registration area [3GPP TS 38.300].

NG-RAN node UE context is a collection of information in an NG-RAN node associated with one UE, which contains the necessary information required to maintain the NG-RAN services towards the UE in a CONNECTED state. This includes UE's identifiers and those allocated by network, PDU session details, user plane tunnel addresses and other user session information. The UE context may also include some capability information and intelligence generated by network pertaining to that UE.

As disclosed herein, UE Context is divided into two categories including UE Connection Context and UE Historical Intelligence. UE Connection Context describes the establishment of the UE connection such as UE identifiers, UE capability, protocol data unit (PDU) sessions IDs, allowed Network Slice Selection Assistance Information (NSSAI) and/or the like). UE Historical Intelligence includes information generated based on the use cases such as self-organizing network (SON) applications and artificial intelligence and/or machine learning (AI/ML) solutions and are used to identify UE such as UE trajectory, power-related, mobility-related behaviors, patterns, and/or the like.

UE Context in RRC_INACTIVE state is currently stored in the central entities (for ex: gNB-CU), and in an instance of mobility in RRC Inactive or small data transmission in RRC Inactive, UE Context needs to be retrieved by the target network node gNB from the anchor network node gNB over peer-to-peer interfaces (Xn). Frequent occurrence of such operations cause significant signaling overhead.

In the case an Xn interface is not configured or establishment is not possible between the source and the target gNBs due to not being in the same RAN Notification Area (RNA), for example, UE Context retrieval is infeasible using RAN interfaces. This limitation is tackled by workaround solutions that do not address the latency issues, nor are such workarounds agreed upon in 3GPP RAN3.

According to example embodiments provided herein, the use of the central RAN database to store and retrieve UE Context can address the above-mentioned issues. Considering that in large networks, a single database (DB) entity for all UEs is not feasible, handing the UE Context retrieval in a distributed database architecture for RRC_INACTIVE state UEs in an optimized and secure way is not currently addressed.

Therefore, example embodiments provided herein address at least the issues presented above. Example embodiments provided herein enable UE Context retrieval in RRC_INACTIVE state from a radio access network (RAN) database (DB) within a distributed DB architecture with improved efficiency and improved security. Although RRC_INACTIVE state is used to illustrate various example embodiments herein, the presented embodiments can also be applicable to a new power-efficient state that may be introduced during the development of future wireless and mobile communications systems, e.g., 5G evolution or 6G. The UE Context is stored in the RAN DB with a unique key, UE ID such as inactive Radio Network Temporary Identifier (I-RNTI), by the source network node gNB, when the UE is transitioned to RRC_INACTIVE, and information enabling retrieval from the RAN DB is communicated as described herein.

An apparatus is provided, such as a user equipment (UE), including at least one processor and at least one memory including computer program code, the at least one memory and the computer program code configured to, with the processor, cause the apparatus to at least receive, from a source network node, a connection release message comprising at least one inactive radio network temporary identifier (I-RNTI) version associated with at least one of a source radio access network database area (RDBA) or a source radio access network database set area (RDSA). The at least one memory and the computer program code are further configured to, with the processor, cause the apparatus to generate a connection resume request based at least in part on the received I-RNTI version.

The at least one memory and the computer program code are further configured to, with the processor, cause the apparatus to receive, from the source network node, the at least one of the source radio access network database area (RDBA) or the source radio access network set area (RDSA), wherein generating the connection resume request is further based on the at least one of the source RDBA or the source RDSA.

The at least one memory and the computer program code are further configured to, with the processor, cause the apparatus to upon mobility to a target cell, receive broadcasted system information of the target cell, wherein the broadcasted system information comprises a target cell identifier and a target tracking area of a target network node.

Generating the connection resume request comprises performing a comparison of the at least the source RDBA or the source RDSA to at least a portion of the broadcasted system information of the target cell or a target tracking area to determine an I-RNTI version by which to generate the connection resume request by determining whether the at least one of the target cell or the target tracking area belongs to (a) the source RDBA, the (b) source RDSA but not the source RDBA, or (c) neither of the source RDBA or the source RDSA.

The connection resume request comprises the determined I-RNTI version, and dependent thereon, at least one of the source RDBA, the source RDSA, or an identifier of the source network node.

The at least the portion of the broadcasted system information of the target cell to which the at least one of the source RDBA or the source RDSA is compared comprises at least one of a target RDBA or a target RDSA.

The at least one memory and the computer program code are further configured to, with the processor, cause the apparatus to transmit the connection resume request toward the target network node.

The connection release message comprises at least one I-RNTI comprising a UE identifier and at least a two-bit indicator to indicate the I-RNTI version. The at least one of the source RDBA or the source RDSA comprise at least one of one or more source tracking areas or one or more source cell identifiers that serve the source RDBA and the source RDSA, and wherein performing the comparison comprises determining whether the at least one of the target cell or the target tracking area are included in the one or more source tracking areas or the one or more source cell identifiers received or referenced in the connection release message.

The determined I-RNTI version is determined from a plurality of I-RNTI versions comprising at least a first I-RNTI version configured for use in the connection resume request when the apparatus is outside both the RDBA and the RDSA, and wherein the I-RNTI further comprises the identifier of the source network node.

The determined I-RNTI version is determined from a plurality of I-RNTI versions comprising at least a second I-RNTI version configured for use in the connection resume request when the apparatus is inside the RDBA.

The determined I-RNTI version is determined from a plurality of I-RNTI versions comprising at least a third I-RNTI version configured for use in the connection resume request when the apparatus is outside the source RDBA and inside or outside the source RDSA, and wherein the I-RNTI further comprises a radio access network (RAN) database (DB) identifier (ID) and a RAN DB set ID.

The source network node may be connected to one or more radio access network (RAN) databases (DB). The target network node may be connected to one or more radio access network (RAN) databases (DB).

The source RDBA comprises a radio access network (RAN) database (DB) in which a UE context of the apparatus is stored, and the source RDSA comprises a RDBA set comprising one or more inter-connected radio access network (RAN) databases (DB), one of which is the RAN DB in which the UE context of the apparatus is stored.

The one or more I-RNTI versions to be used in a connection resume request are determined dependent on a location of the apparatus relative to the at least one of the source RDBA or the source RDSA.

Another apparatus is provided, such as a source network node, including at least one processor and at least one memory including computer program code, the at least one memory and the computer program code configured to, with the processor, cause the apparatus to at least transmit a connection release message toward a user equipment (UE), the connection release message comprising one or more inactive radio network temporary identifier (I-RNTI) versions associated with at least one of a source radio access network database area (RDBA) or a source radio access network set area (RDSA), and store a UE context in association with one or more unique identifiers comprising an I-RNTI or a portion thereof in a source RAN DB identified by an assigned RAN DB identifier (ID).

The connection release message comprises at least one of one or more source tracking areas or one or more source cell identifiers that serve the at least one of the source RDBA or the source RDSA.

Another apparatus is provided, such as a target network node, comprising at least one processor and at least one memory including computer program code, the at least one memory and the computer program code configured to, with the processor, cause the apparatus to at least receive a connection resume request comprising at least an inactive radio network temporary identifier (I-RNTI) version, and dependent thereon, at least one of a source radio access network (RAN) database (DB) identifier (ID), a source RAN DB set ID, or a source RAN node identifier. The at least one memory and the computer program code are further configured to, with the processor, cause the apparatus to process the connection resume request and dependent on the I-RNTI version, extract the at least one of the source RAN DB ID, the source RAN DB set ID, or the source RAN node identifier.

The at least one memory and the computer program code are further configured to, with the processor, cause the apparatus to at least retrieve a UE context from the source RAN DB using the extracted I-RNTI or a portion thereof and at least one of the source RAN DB ID, the source RAN DB set ID, or the source RAN node identifier.

The at least one memory and the computer program code are configured to, with the processor, cause the apparatus to at least broadcast system information toward a user equipment (UE), the system information comprising a target radio access network database area (RDBA) and a target radio access network database set area (RDSA).

The UE context is retrieved via broadcasting to a RAN DB set identified by the source RAN DB set ID. In an absence of a direct communication interface between a target RDBA and source RAN DBs identified by the source RAN DB set ID, the UE context is retrieved via a global database via a direct or peer-to-peer interface to the said global database. The UE context is retrieved via a direct interface to a RAN DB identified by the source RAN DB ID.

The UE context is retrieved via a peer-to-peer interface through a source network node identified by the source RAN node identifier.

Another apparatus is provided, such as a user equipment (UE), including comprising at least one processor and at least one memory including computer program code, the at least one memory and the computer program code configured to, with the processor, cause the apparatus to at least receive, from a source network node, a connection release message comprising at least one inactive radio network temporary identifier (I-RNTI) version associated with a source RAN node set identifier.

The at least one memory and the computer program code are further configured to, with the processor, cause the apparatus to generate a connection resume request based at least in part on the received I-RNTI version. The at least one memory and the computer program code are further configured to, with the processor, cause the apparatus to receive, from the source network node, the source RAN node set identifier, wherein generating the connection resume request is further based on the source RAN node set identifier.

The at least one memory and the computer program code are further configured to, with the processor, cause the apparatus to, upon mobility to a target cell, receive broadcasted system information of the target cell, wherein the broadcasted system information comprises a target cell identifier and a target tracking area of a target network node. Generating the connection resume request comprises performing a comparison of a source network node set area identified by the received source RAN node set identifier to the at least one of the target cell or the target tracking area to determine an I-RNTI version by which to generate the connection resume request, by determining whether or not the target cell or the target tracking area belongs to the source network node set area.

The connection resume request may include the determined one or more I-RNTI version, and dependent thereon, at least one of the source RAN node identifier or the source RAN node set identifier. The at least one memory and the computer program code are further configured to, with the processor, cause the apparatus to transmit the connection resume request toward the target network node. The broadcasted system information comprises a target network node set identifier, and wherein the at least one of a target tracking area or the target cell is included in the target network node set identified by the target network node set identifier.

The source RAN node set identifier identifies a source network node set comprising one or more source network nodes assigned to a radio access network (RAN) database (DB) in which a UE context of the apparatus is stored.

The I-RNTI version is determined dependent on a location of the apparatus relative to a source network node set identified by the source RAN node set identifier.

The connection release message comprises at least one I-RNTI comprising a UE identifier and at least a one-bit indicator to indicate the I-RNTI version. The determined I-RNTI version is determined from a plurality of I-RNTI versions comprising at least a first I-RNTI version configured for use in the connection resume request when the apparatus is outside the source network node set area identified by the source RAN node set identifier and wherein the I-RNTI further comprises the source RAN node identifier.

The determined I-RNTI version is determined from a plurality of I-RNTI versions comprising at least a second I-RNTI version configured for use in the connection resume request when the apparatus is inside the source network node set area identified by the source RAN node set identifier, and wherein the I-RNTI further comprises the source RAN node set identifier.

The source network node is connected to one or more RAN DBs. The target network node is connected to one or more RAN DBs. The source network node set area identified by the source RAN node set identifier comprises one or more source areas or source cell identifiers.

An apparatus is provided, such as a source network node, comprising at least one processor and at least one memory including computer program code, the at least one memory and the computer program code configured to, with the processor, cause the apparatus to at least transmit a connection release message toward a user equipment (UE), the connection release message comprising a one or more inactive radio network temporary identifier (I-RNTI) versions, and a source RAN node set identifier. The at least one memory and the computer program code are further configured to, with the processor, cause the apparatus to store a UE context in association with one or more unique identifiers comprising an I-RNTI or a portion thereof at a source RAN DB identified by an assigned RAN DB identifier (ID).

Another apparatus is provided, such as a target network node, comprising at least one processor and at least one memory including computer program code, the at least one memory and the computer program code are configured to, with the processor, cause the apparatus to at least receive a connection resume request comprising at least an inactive radio network temporary identifier (I-RNTI) version, and dependent thereon, at least one of a source RAN node identifier or a source RAN node set identifier.

The at least one memory and the computer program code are further configured to, with the processor, process the connection resume request and dependent on the I-RNTI version, extract the at least one of the source RAN node identifier or a source RAN node set identifier. The at least one memory and the computer program code are further configured to, with the processor, retrieve a UE context from a source radio access network (RAN) database (DB) using the extracted at least one of the source RAN node identifier or the source RAN node set identifier.

The at least one memory and the computer program code are further configured to, with the processor, broadcast system information toward a user equipment (UE), the system information comprising a target network node set identifier toward a user equipment (UE).

The UE context is retrieved via broadcasting to a source network node set identified by the source RAN node set identifier. The UE context may be retrieved via a direct interface to a global database. The UE context may be retrieved via a peer-to-peer interface through a source network node identified by the source RAN node identifier.

A method is provided, such as performed by user equipment (UE), including receiving from a source network node, a connection release message comprising at least one inactive radio network temporary identifier (I-RNTI) version associated with at least one of a source radio access network database area (RDBA) or a source radio access network database set area (RDSA). The method further includes generating a connection resume request based at least in part on the received I-RNTI version.

The method further includes receiving, from the source network node, the at least one of the source radio access network database area (RDBA) or the source radio access network set area (RDSA), wherein generating the connection resume request is further based on the at least one of the source RDBA or the source RDSA.

The method further includes, upon mobility to a target cell, receiving broadcasted system information of the target cell, wherein the broadcasted system information comprises a target cell identifier and a target tracking area of a target network node.

Generating the connection resume request comprises performing a comparison of the at least the source RDBA or the source RDSA to at least a portion of the broadcasted system information of the target cell or a target tracking area to determine an I-RNTI version by which to generate the connection resume request by determining whether the at least one of the target cell or the target tracking area belongs to (a) the source RDBA, the (b) source RDSA but not the source RDBA, or (c) neither of the source RDBA or the source RDSA.

The connection resume request comprises the determined I-RNTI version, and dependent thereon, at least one of the source RDBA, the source RDSA, or an identifier of the source network node.

The at least the portion of the broadcasted system information of the target cell to which the at least one of the source RDBA or the source RDSA is compared comprises at least one of a target RDBA or a target RDSA.

The method further includes transmitting the connection resume request toward the target network node.

The connection release message comprises at least one I-RNTI comprising a UE identifier and at least a two-bit indicator to indicate the I-RNTI version. The at least one of the source RDBA or the source RDSA comprise at least one of one or more source tracking areas or one or more source cell identifiers that serve the source RDBA and the source RDSA, and wherein performing the comparison comprises determining whether the at least one of the target cell or the target tracking area are included in the one or more source tracking areas or the one or more source cell identifiers received or referenced in the connection release message.

The determined I-RNTI version is determined from a plurality of I-RNTI versions comprising at least a first I-RNTI version configured for use in the connection resume request when user equipment (UE) is outside both the RDBA and the RDSA, and wherein the I-RNTI further comprises the identifier of the source network node.

The determined I-RNTI version is determined from a plurality of I-RNTI versions comprising at least a second I-RNTI version configured for use in the connection resume request when the UE is inside the RDBA.

The determined I-RNTI version is determined from a plurality of I-RNTI versions comprising at least a third I-RNTI version configured for use in the connection resume request when the UE is outside the source RDBA and inside or outside the source RDSA, and wherein the I-RNTI further comprises a radio access network (RAN) database (DB) identifier (ID) and a RAN DB set ID.

The source network node may be connected to one or more radio access network (RAN) databases (DB). The target network node may be connected to one or more radio access network (RAN) databases (DB).

The source RDBA comprises a radio access network (RAN) database (DB) in which a UE context is stored, and the source RDSA comprises a RDBA set comprising one or more inter-connected radio access network (RAN) databases (DB), one of which is the RAN DB in which the UE context is stored.

The one or more I-RNTI versions to be used in a connection resume request are determined dependent on a location of the user equipment (UE) relative to the at least one of the source RDBA or the source RDSA.

Another method is provided, such as a method performed by a source network node. The method includes transmitting and/or causing transmission of a connection release message toward a user equipment (UE), the connection release message comprising one or more inactive radio network temporary identifier (I-RNTI) versions associated with at least one of a source radio access network database area (RDBA) or a source radio access network set area (RDSA), and store a UE context in association with one or more unique identifiers comprising an I-RNTI or a portion thereof in a source RAN DB identified by an assigned RAN DB identifier (ID).

The connection release message comprises at least one of one or more source tracking areas or one or more source cell identifiers that serve the at least one of the source RDBA or the source RDSA.

Another method is provided, such as may be performed by a target network node, including receiving a connection resume request comprising at least an inactive radio network temporary identifier (I-RNTI) version, and dependent thereon, at least one of a source radio access network (RAN) database (DB) identifier (ID), a source RAN DB set ID, or a source RAN node identifier. The method further includes processing the connection resume request and dependent on the I-RNTI version, extract the at least one of the source RAN DB ID, the source RAN DB set ID, or the source RAN node identifier.

The method further includes retrieving a UE context from the source RAN DB using the extracted I-RNTI or a portion thereof and at least one of the source RAN DB ID, the source RAN DB set ID, or the source RAN node identifier.

The method further includes broadcasting system information toward a user equipment (UE), the system information comprising a target radio access network database area (RDBA) and a target radio access network database set area (RDSA).

The UE context is retrieved via broadcasting to a RAN DB set identified by the source RAN DB set ID. In an absence of a direct communication interface between a target RDBA and source RAN DB s identified by the source RAN DB set ID, the UE context is retrieved via a global database via a direct or peer-to-peer interface to the said global database. The UE context is retrieved via a direct interface to a RAN DB identified by the source RAN DB ID.

The UE context is retrieved via a peer-to-peer interface through a source network node identified by the source RAN node identifier.

Another method is provided, such as performed by a user equipment (UE). The method includes receiving, from a source network node, a connection release message comprising at least one inactive radio network temporary identifier (I-RNTI) version associated with a source RAN node set identifier.

The method further includes generating a connection resume request based at least in part on the received I-RNTI version. The method further includes receiving, from the source network node, the source RAN node set identifier, wherein generating the connection resume request is further based on the source RAN node set identifier.

The method further includes, upon mobility to a target cell, receiving broadcasted system information of the target cell, wherein the broadcasted system information comprises a target cell identifier and a target tracking area of a target network node. Generating the connection resume request comprises performing a comparison of a source network node set area identified by the received source RAN node set identifier to the at least one of the target cell or the target tracking area to determine an I-RNTI version by which to generate the connection resume request, by determining whether or not the target cell or the target tracking area belongs to the source network node set area.

The connection resume request may include the determined one or more I-RNTI version, and dependent thereon, at least one of the source RAN node identifier or the source RAN node set identifier. The method may further include transmitting the connection resume request toward the target network node. The broadcasted system information comprises a target network node set identifier, and wherein the at least one of a target tracking area or the target cell is included in the target network node set identified by the target network node set identifier.

The source RAN node set identifier identifies a source network node set comprising one or more source network nodes assigned to a radio access network (RAN) database (DB) in which a UE context is stored.

The I-RNTI version is determined dependent on a location of user equipment (UE) relative to a source network node set identified by the source RAN node set identifier.

The connection release message comprises at least one I-RNTI comprising a UE identifier and at least a one-bit indicator to indicate the I-RNTI version. The determined I-RNTI version is determined from a plurality of I-RNTI versions comprising at least a first I-RNTI version configured for use in the connection resume request when the UE is outside the source network node set area identified by the source RAN node set identifier and wherein the I-RNTI further comprises the source RAN node identifier.

The determined I-RNTI version is determined from a plurality of I-RNTI versions comprising at least a second I-RNTI version configured for use in the connection resume request when the user equipment (UE) is inside the source network node set area identified by the source RAN node set identifier, and wherein the I-RNTI further comprises the source RAN node set identifier.

The source network node is connected to one or more RAN DBs. The target network node is connected to one or more RAN DBs. The source network node set area identified by the source RAN node set identifier comprises one or more source areas or source cell identifiers.

Another method is provided, such may be performed by a source network node, including transmitting and/or causing transmission of a connection release message toward a user equipment (UE), the connection release message comprising a one or more inactive radio network temporary identifier (I-RNTI) versions, and a source RAN node set identifier. The method further includes storing a UE context in association with one or more unique identifiers comprising an I-RNTI or a portion thereof at a source RAN DB identified by an assigned RAN DB identifier (ID).

Another method is provided, such as performed by a target network node, the method including receiving a connection resume request comprising at least an inactive radio network temporary identifier (I-RNTI) version, and dependent thereon, at least one of a source RAN node identifier or a source RAN node set identifier.

The method further includes processing the connection resume request and dependent on the I-RNTI version, extracting the at least one of the source RAN node identifier or a source RAN node set identifier. The method further includes retrieving a UE context from a source radio access network (RAN) database (DB) using the extracted at least one of the source RAN node identifier or the source RAN node set identifier.

The method further includes broadcasting system information toward a user equipment (UE), the system information comprising a target network node set identifier toward a user equipment (UE).

The UE context is retrieved via broadcasting to a source network node set identified by the source RAN node set identifier. The UE context may be retrieved via a direct interface to a global database. The UE context may be retrieved via a peer-to-peer interface through a source network node identified by the source RAN node identifier.

A computer program product is provided, comprising at least one non-transitory computer-readable storage medium having computer-executable program code instructions stored therein, the computer-executable program code instructions comprising program code instructions to at least receive, at a user equipment (UE), and from a source network node, a connection release message comprising at least one inactive radio network temporary identifier (I-RNTI) version associated with at least one of a source radio access network database area (RDBA) or a source radio access network database set area (RDSA). The computer-executable program code instructions further comprise program code instructions to generate a connection resume request based at least in part on the received I-RNTI version.

The computer-executable program code instructions further comprise program code instructions to receive, from the source network node, the at least one of the source radio access network database area (RDBA) or the source radio access network set area (RDSA), wherein generating the connection resume request is further based on the at least one of the source RDBA or the source RDSA.

The computer-executable program code instructions further comprise program code instructions to upon mobility to a target cell, receive broadcasted system information of the target cell, wherein the broadcasted system information comprises a target cell identifier and a target tracking area of a target network node.

Generating the connection resume request comprises performing a comparison of the at least the source RDBA or the source RDSA to at least a portion of the broadcasted system information of the target cell or a target tracking area to determine an I-RNTI version by which to generate the connection resume request by determining whether the at least one of the target cell or the target tracking area belongs to (a) the source RDBA, the (b) source RDSA but not the source RDBA, or (c) neither of the source RDBA or the source RDSA.

The connection resume request comprises the determined I-RNTI version, and dependent thereon, at least one of the source RDBA, the source RDSA, or an identifier of the source network node.

The at least the portion of the broadcasted system information of the target cell to which the at least one of the source RDBA or the source RDSA is compared comprises at least one of a target RDBA or a target RDSA.

The computer-executable program code instructions further comprise program code instructions to transmit the connection resume request toward the target network node.

The connection release message comprises at least one I-RNTI comprising a UE identifier and at least a two-bit indicator to indicate the I-RNTI version. The at least one of the source RDBA or the source RDSA comprise at least one of one or more source tracking areas or one or more source cell identifiers that serve the source RDBA and the source RDSA, and wherein performing the comparison comprises determining whether the at least one of the target cell or the target tracking area are included in the one or more source tracking areas or the one or more source cell identifiers received or referenced in the connection release message.

The determined I-RNTI version is determined from a plurality of I-RNTI versions comprising at least a first I-RNTI version configured for use in the connection resume request when the user equipment (UE) is outside both the RDBA and the RDSA, and wherein the I-RNTI further comprises the identifier of the source network node.

The determined I-RNTI version is determined from a plurality of I-RNTI versions comprising at least a second I-RNTI version configured for use in the connection resume request when the user equipment (UE) is inside the RDBA.

The determined I-RNTI version is determined from a plurality of I-RNTI versions comprising at least a third I-RNTI version configured for use in the connection resume request when the user equipment (UE) is outside the source RDBA and inside or outside the source RDSA, and wherein the I-RNTI further comprises a radio access network (RAN) database (DB) identifier (ID) and a RAN DB set ID.

The source network node may be connected to one or more radio access network (RAN) databases (DB). The target network node may be connected to one or more radio access network (RAN) databases (DB).

The source RDBA comprises a radio access network (RAN) database (DB) in which a UE context is stored, and the source RDSA comprises a RDBA set comprising one or more inter-connected radio access network (RAN) databases (DB), one of which is the RAN DB in which the UE context is stored.

The one or more I-RNTI versions to be used in a connection resume request are determined dependent on a location of the user equipment (UE) relative to the at least one of the source RDBA or the source RDSA.

Another computer program product is provided, comprising at least one non-transitory computer-readable storage medium having computer-executable program code instructions stored therein, the computer-executable program code instructions comprising program code instructions to cause transmission of and/or transmit a connection release message toward a user equipment (UE), the connection release message comprising one or more inactive radio network temporary identifier (I-RNTI) versions associated with at least one of a source radio access network database area (RDBA) or a source radio access network set area (RDSA), and store a UE context in association with one or more unique identifiers comprising an I-RNTI or a portion thereof in a source RAN DB identified by an assigned RAN DB identifier (ID).

The connection release message comprises at least one of one or more source tracking areas or one or more source cell identifiers that serve the at least one of the source RDBA or the source RDSA.

Another computer program product is provided, comprising at least one non-transitory computer-readable storage medium having computer-executable program code instructions stored therein, the computer-executable program code instructions comprising program code instructions to perform at least receive a connection resume request comprising at least an inactive radio network temporary identifier (I-RNTI) version, and dependent thereon, at least one of a source radio access network (RAN) database (DB) identifier (ID), a source RAN DB set ID, or a source RAN node identifier. The computer-executable program code instructions further comprise program code instructions to process the connection resume request and dependent on the I-RNTI version, extract the at least one of the source RAN DB ID, the source RAN DB set ID, or the source RAN node identifier.

The computer-executable program code instructions further comprise program code instructions to at least retrieve a UE context from the source RAN DB using the extracted I-RNTI or a portion thereof and at least one of the source RAN DB ID, the source RAN DB set ID, or the source RAN node identifier.

The computer-executable program code instructions further comprise program code instructions to broadcast system information toward a user equipment (UE), the system information comprising a target radio access network database area (RDBA) and a target radio access network database set area (RDSA).

The UE context is retrieved via broadcasting to a RAN DB set identified by the source RAN DB set ID. In an absence of a direct communication interface between a target RDBA and source RAN DB s identified by the source RAN DB set ID, the UE context is retrieved via a global database via a direct or peer-to-peer interface to the said global database. The UE context is retrieved via a direct interface to a RAN DB identified by the source RAN DB ID.

The UE context is retrieved via a peer-to-peer interface through a source network node identified by the source RAN node identifier.

Another computer program product is provided, comprising at least one non-transitory computer-readable storage medium having computer-executable program code instructions stored therein, the computer-executable program code instructions comprising program code instructions to receive, from a source network node, a connection release message comprising at least one inactive radio network temporary identifier (I-RNTI) version associated with a source RAN node set identifier.

The computer-executable program code instructions further comprise program code instructions to generate a connection resume request based at least in part on the received I-RNTI version. The computer-executable program code instructions further comprise program code instructions to receive, from the source network node, the source RAN node set identifier, wherein generating the connection resume request is further based on the source RAN node set identifier. The computer-executable program code instructions further comprise program code instructions to, upon mobility to a target cell, receive broadcasted system information of the target cell, wherein the broadcasted system information comprises a target cell identifier and a target tracking area of a target network node. Generating the connection resume request comprises performing a comparison of a source network node set area identified by the received source RAN node set identifier to the at least one of the target cell or the target tracking area to determine an I-RNTI version by which to generate the connection resume request, by determining whether or not the target cell or the target tracking area belongs to the source network node set area.

The connection resume request may include the determined one or more I-RNTI version, and dependent thereon, at least one of the source RAN node identifier or the source RAN node set identifier. The computer-executable program code instructions further comprise program code instructions to transmit the connection resume request toward the target network node. The broadcasted system information comprises a target network node set identifier, and wherein the at least one of a target tracking area or the target cell is included in the target network node set identified by the target network node set identifier.

The source RAN node set identifier identifies a source network node set comprising one or more source network nodes assigned to a radio access network (RAN) database (DB) in which a UE context is stored.

The I-RNTI version is determined dependent on a location of the user equipment (UE) relative to a source network node set identified by the source RAN node set identifier.

The connection release message comprises at least one I-RNTI comprising a UE identifier and at least a one-bit indicator to indicate the I-RNTI version. The determined I-RNTI version is determined from a plurality of I-RNTI versions comprising at least a first I-RNTI version configured for use in the connection resume request when the user equipment (UE) is outside the source network node set area identified by the source RAN node set identifier and wherein the I-RNTI further comprises the source RAN node identifier.

The determined I-RNTI version is determined from a plurality of I-RNTI versions comprising at least a second I-RNTI version configured for use in the connection resume request when the user equipment (UE) is inside the source network node set area identified by the source RAN node set identifier, and wherein the I-RNTI further comprises the source RAN node set identifier.

The source network node is connected to one or more RAN DBs. The target network node is connected to one or more RAN DBs. The source network node set area identified by the source RAN node set identifier comprises one or more source areas or source cell identifiers.

Another computer program product is provided, comprising at least one non-transitory computer-readable storage medium having computer-executable program code instructions stored therein, the computer-executable program code instructions comprising program code instructions to at least transmit a connection release message toward a user equipment (UE), the connection release message comprising a one or more inactive radio network temporary identifier (I-RNTI) versions, and a source RAN node set identifier. The computer-executable program code instructions further comprise program code instructions to store a UE context in association with one or more unique identifiers comprising an I-RNTI or a portion thereof at a source RAN DB identified by an assigned RAN DB identifier (ID).

Another computer program product is provided comprising at least one non-transitory computer-readable storage medium having computer-executable program code instructions stored therein, the computer-executable program code instructions comprising program code instructions to at least receive a connection resume request comprising at least an inactive radio network temporary identifier (I-RNTI) version, and dependent thereon, at least one of a source RAN node identifier or a source RAN node set identifier.

The computer-executable program code instructions further comprise program code instructions to at least process the connection resume request and dependent on the I-RNTI version, extract the at least one of the source RAN node identifier or a source RAN node set identifier. The computer-executable program code instructions further comprise program code instructions to, retrieve a UE context from a source radio access network (RAN) database (DB) using the extracted at least one of the source RAN node identifier or the source RAN node set identifier.

The computer-executable program code instructions further comprise program code instructions to, broadcast system information toward a user equipment (UE), the system information comprising a target network node set identifier toward a user equipment (UE).

The UE context is retrieved via broadcasting to a source network node set identified by the source RAN node set identifier. The UE context may be retrieved via a direct interface to a global database. The UE context may be retrieved via a peer-to-peer interface through a source network node identified by the source RAN node identifier.

An apparatus is provided, such as a user equipment (UE), including means for receiving from a source network node, a connection release message comprising at least one inactive radio network temporary identifier (I-RNTI) version associated with at least one of a source radio access network database area (RDBA) or a source radio access network database set area (RDSA). The apparatus further includes means for generating a connection resume request based at least in part on the received I-RNTI version.

The apparatus further includes means for receiving, from the source network node, the at least one of the source radio access network database area (RDBA) or the source radio access network set area (RDSA), wherein generating the connection resume request is further based on the at least one of the source RDBA or the source RDSA.

The apparatus further includes means for, upon mobility to a target cell, receiving broadcasted system information of the target cell, wherein the broadcasted system information comprises a target cell identifier and a target tracking area of a target network node.

Generating the connection resume request comprises performing a comparison of the at least the source RDBA or the source RDSA to at least a portion of the broadcasted system information of the target cell or a target tracking area to determine an I-RNTI version by which to generate the connection resume request by determining whether the at least one of the target cell or the target tracking area belongs to (a) the source RDBA, the (b) source RDSA but not the source RDBA, or (c) neither of the source RDBA or the source RDSA.

The connection resume request comprises the determined I-RNTI version, and dependent thereon, at least one of the source RDBA, the source RDSA, or an identifier of the source network node.

The at least the portion of the broadcasted system information of the target cell to which the at least one of the source RDBA or the source RDSA is compared comprises at least one of a target RDBA or a target RDSA.

The apparatus further includes means for transmitting the connection resume request toward the target network node.

The connection release message comprises at least one I-RNTI comprising a UE identifier and at least a two-bit indicator to indicate the I-RNTI version. The at least one of the source RDBA or the source RDSA comprise at least one of one or more source tracking areas or one or more source cell identifiers that serve the source RDBA and the source RDSA, and wherein performing the comparison comprises determining whether the at least one of the target cell or the target tracking area are included in the one or more source tracking areas or the one or more source cell identifiers received or referenced in the connection release message.

The determined I-RNTI version is determined from a plurality of I-RNTI versions comprising at least a first I-RNTI version configured for use in the connection resume request when user equipment (UE) is outside both the RDBA and the RDSA, and wherein the I-RNTI further comprises the identifier of the source network node.

The determined I-RNTI version is determined from a plurality of I-RNTI versions comprising at least a second I-RNTI version configured for use in the connection resume request when the UE is inside the RDBA.

The determined I-RNTI version is determined from a plurality of I-RNTI versions comprising at least a third I-RNTI version configured for use in the connection resume request when the UE is outside the source RDBA and inside or outside the source RDSA, and wherein the I-RNTI further comprises a radio access network (RAN) database (DB) identifier (ID) and a RAN DB set ID.

The source network node may be connected to one or more radio access network (RAN) databases (DB). The target network node may be connected to one or more radio access network (RAN) databases (DB).

The source RDBA comprises a radio access network (RAN) database (DB) in which a UE context is stored, and the source RDSA comprises a RDBA set comprising one or more inter-connected radio access network (RAN) databases (DB), one of which is the RAN DB in which the UE context is stored.

The one or more I-RNTI versions to be used in a connection resume request are determined dependent on a location of the user equipment (UE) relative to the at least one of the source RDBA or the source RDSA.

Another apparatus is provided, such a source network node. The apparatus further includes means for transmitting and/or causing transmission of a connection release message toward a user equipment (UE), the connection release message comprising one or more inactive radio network temporary identifier (I-RNTI) versions associated with at least one of a source radio access network database area (RDBA) or a source radio access network set area (RDSA), and store a UE context in association with one or more unique identifiers comprising an I-RNTI or a portion thereof in a source RAN DB identified by an assigned RAN DB identifier (ID).

The connection release message comprises at least one of one or more source tracking areas or one or more source cell identifiers that serve the at least one of the source RDBA or the source RDSA.

Another apparatus is provided, such as a target network node, including means for receiving a connection resume request comprising at least an inactive radio network temporary identifier (I-RNTI) version, and dependent thereon, at least one of a source radio access network (RAN) database (DB) identifier (ID), a source RAN DB set ID, or a source RAN node identifier. The apparatus further includes means for processing the connection resume request and dependent on the I-RNTI version, extract the at least one of the source RAN DB ID, the source RAN DB set ID, or the source RAN node identifier.

The apparatus further includes means for retrieving a UE context from the source RAN DB using the extracted I-RNTI or a portion thereof and at least one of the source RAN DB ID, the source RAN DB set ID, or the source RAN node identifier.

The apparatus further includes means for broadcasting system information toward a user equipment (UE), the system information comprising a target radio access network database area (RDBA) and a target radio access network database set area (RDSA).

The UE context is retrieved via broadcasting to a RAN DB set identified by the source RAN DB set ID. In an absence of a direct communication interface between a target RDBA and source RAN DB s identified by the source RAN DB set ID, the UE context is retrieved via a global database via a direct or peer-to-peer interface to the said global database. The UE context is retrieved via a direct interface to a RAN DB identified by the source RAN DB ID.

The UE context is retrieved via a peer-to-peer interface through a source network node identified by the source RAN node identifier.

Another apparatus is provided, such a user equipment (UE). The apparatus includes means for receiving, from a source network node, a connection release message comprising at least one inactive radio network temporary identifier (I-RNTI) version associated with a source RAN node set identifier.

The apparatus further includes means for generating a connection resume request based at least in part on the received I-RNTI version. The apparatus further includes means for receiving, from the source network node, the source RAN node set identifier, wherein generating the connection resume request is further based on the source RAN node set identifier.

The apparatus further includes, upon mobility to a target cell, means for receiving broadcasted system information of the target cell, wherein the broadcasted system information comprises a target cell identifier and a target tracking area of a target network node. Generating the connection resume request comprises performing a comparison of a source network node set area identified by the received source RAN node set identifier to the at least one of the target cell or the target tracking area to determine an I-RNTI version by which to generate the connection resume request, by determining whether or not the target cell or the target tracking area belongs to the source network node set area.

The connection resume request may include the determined one or more I-RNTI version, and dependent thereon, at least one of the source RAN node identifier or the source RAN node set identifier. The apparatus includes means for transmitting the connection resume request toward the target network node. The broadcasted system information comprises a target network node set identifier, and wherein the at least one of a target tracking area or the target cell is included in the target network node set identified by the target network node set identifier.

The source RAN node set identifier identifies a source network node set comprising one or more source network nodes assigned to a radio access network (RAN) database (DB) in which a UE context is stored.

The I-RNTI version is determined dependent on a location of user equipment (UE) relative to a source network node set identified by the source RAN node set identifier.

The connection release message comprises at least one I-RNTI comprising a UE identifier and at least a one-bit indicator to indicate the I-RNTI version. The determined I-RNTI version is determined from a plurality of I-RNTI versions comprising at least a first I-RNTI version configured for use in the connection resume request when the UE is outside the source network node set area identified by the source RAN node set identifier and wherein the I-RNTI further comprises the source RAN node identifier.

The determined I-RNTI version is determined from a plurality of I-RNTI versions comprising at least a second I-RNTI version configured for use in the connection resume request when the user equipment (UE) is inside the source network node set area identified by the source RAN node set identifier, and wherein the I-RNTI further comprises the source RAN node set identifier.

The source network node is connected to one or more RAN DBs. The target network node is connected to one or more RAN DBs. The source network node set area identified by the source RAN node set identifier comprises one or more source areas or source cell identifiers.

Another apparatus is provided, such as a source network node, including means for transmitting and/or causing transmission of a connection release message toward a user equipment (UE), the connection release message comprising a one or more inactive radio network temporary identifier (I-RNTI) versions, and a source RAN node set identifier. The apparatus further includes means for storing a UE context in association with one or more unique identifiers comprising an I-RNTI or a portion thereof at a source RAN DB identified by an assigned RAN DB identifier (ID).

Another apparatus is provided, such as a target network node, the apparatus including means for receiving a connection resume request comprising at least an inactive radio network temporary identifier (I-RNTI) version, and dependent thereon, at least one of a source RAN node identifier or a source RAN node set identifier.

The apparatus further includes means for processing the connection resume request and dependent on the I-RNTI version, means for extracting the at least one of the source RAN node identifier or a source RAN node set identifier. The apparatus further includes means for retrieving a UE context from a source radio access network (RAN) database (DB) using the extracted at least one of the source RAN node identifier or the source RAN node set identifier.

The apparatus further includes means for broadcasting system information toward a user equipment (UE), the system information comprising a target network node set identifier toward a user equipment (UE).

The UE context is retrieved via broadcasting to a source network node set identified by the source RAN node set identifier. The UE context may be retrieved via a direct interface to a global database. The UE context may be retrieved via a peer-to-peer interface through a source network node identified by the source RAN node identifier.

BRIEF DESCRIPTION OF THE DRAWINGS

Figure 1:
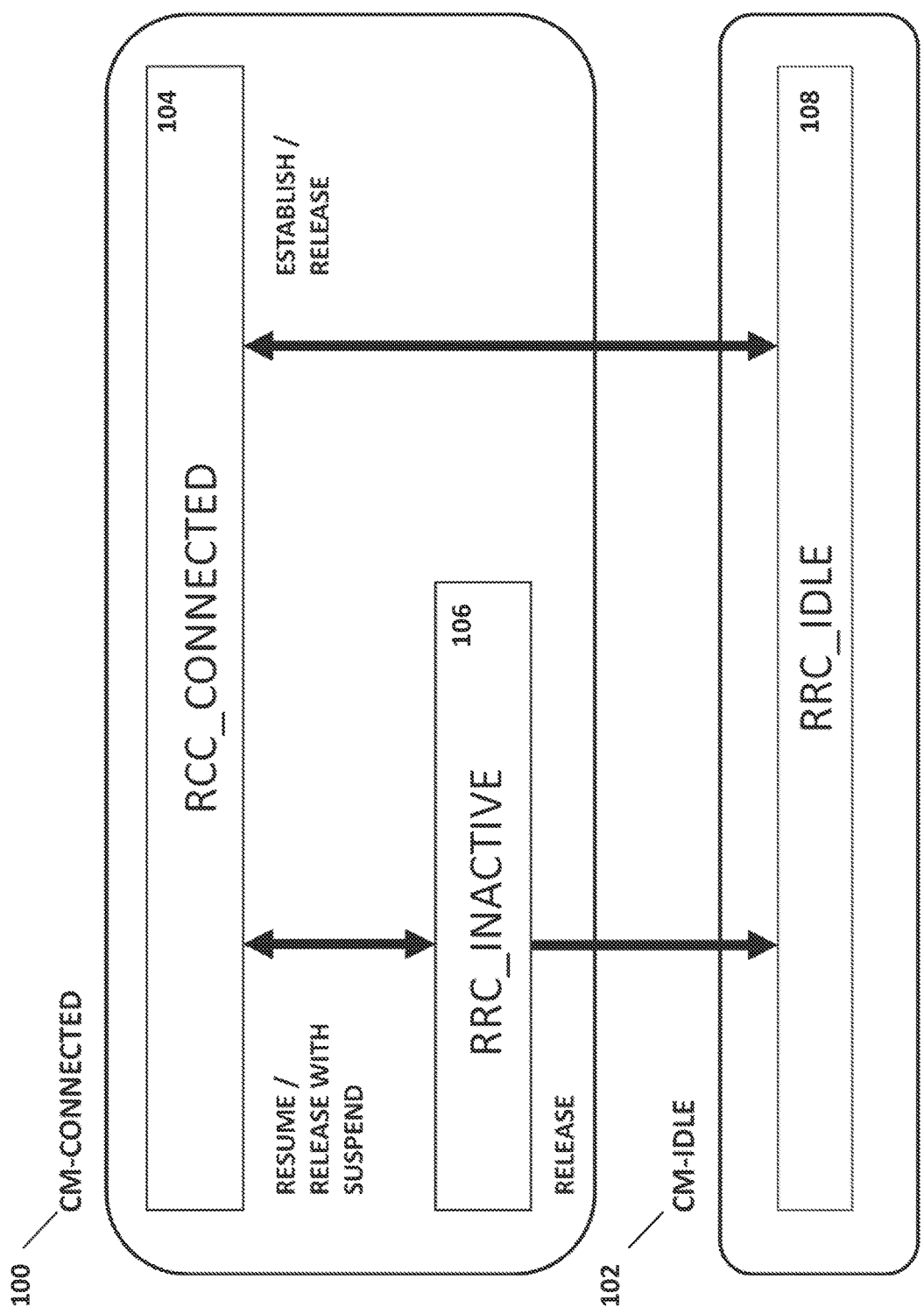
Figure 2:
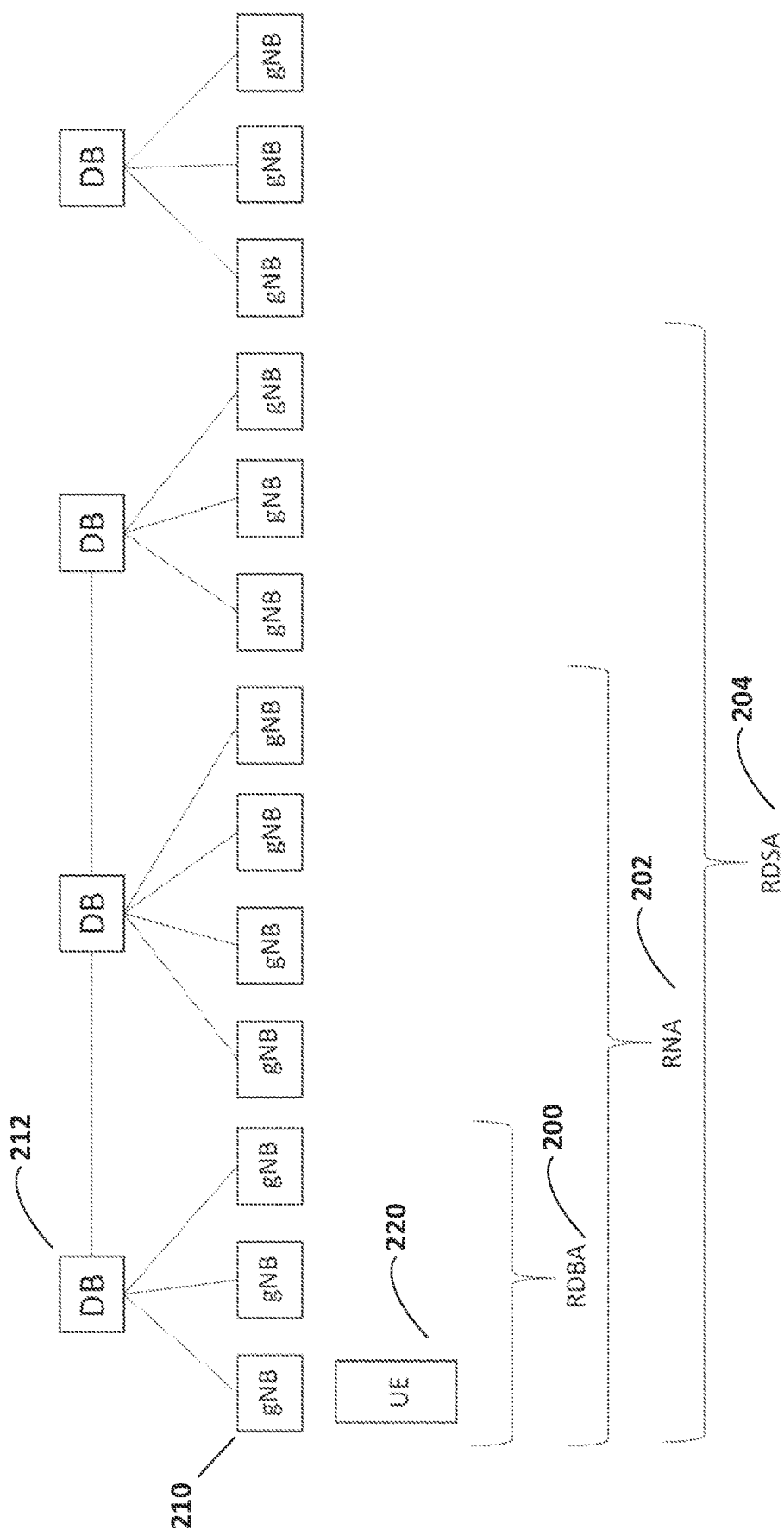
Figure 3:
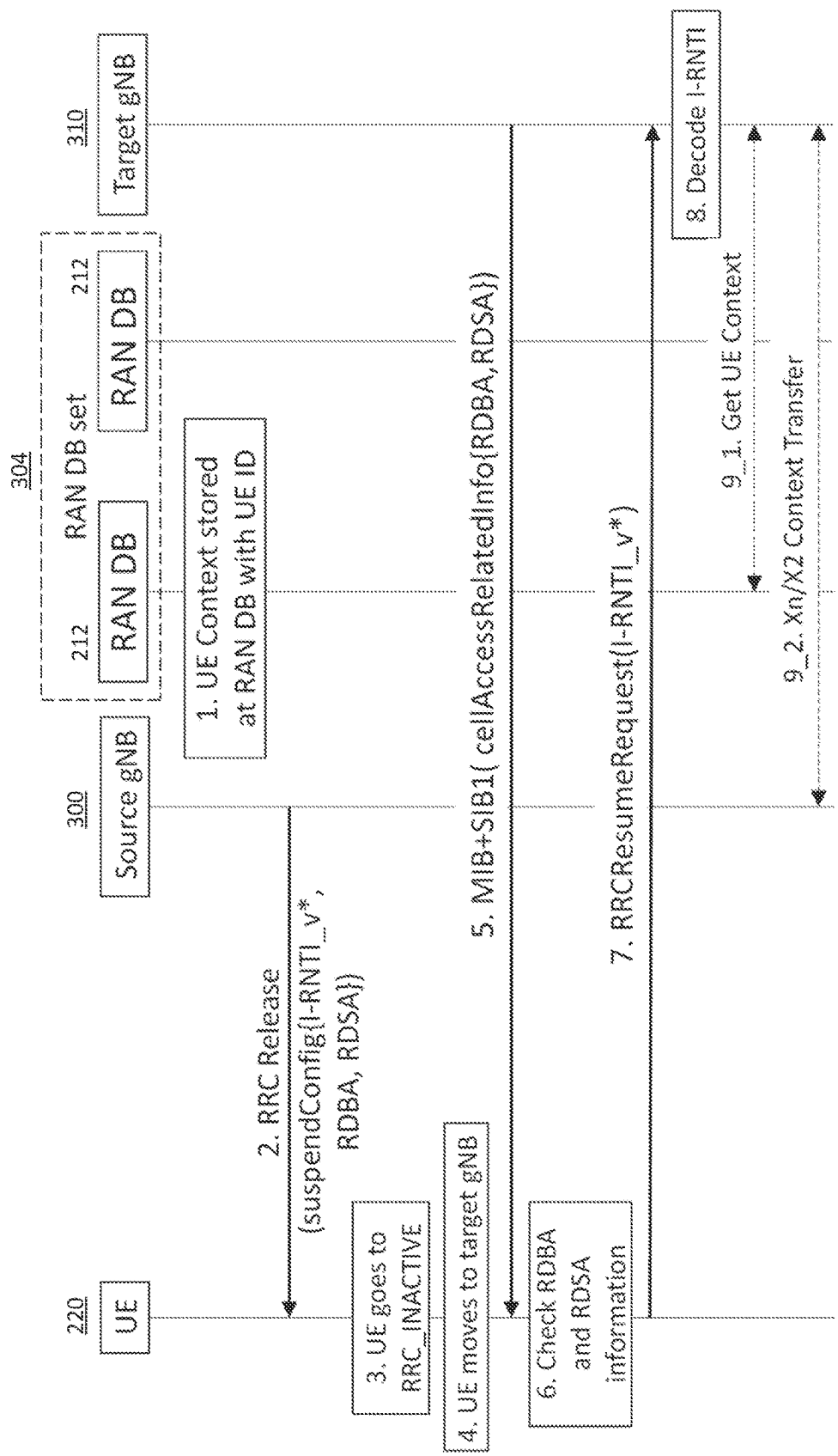
Figure 6:
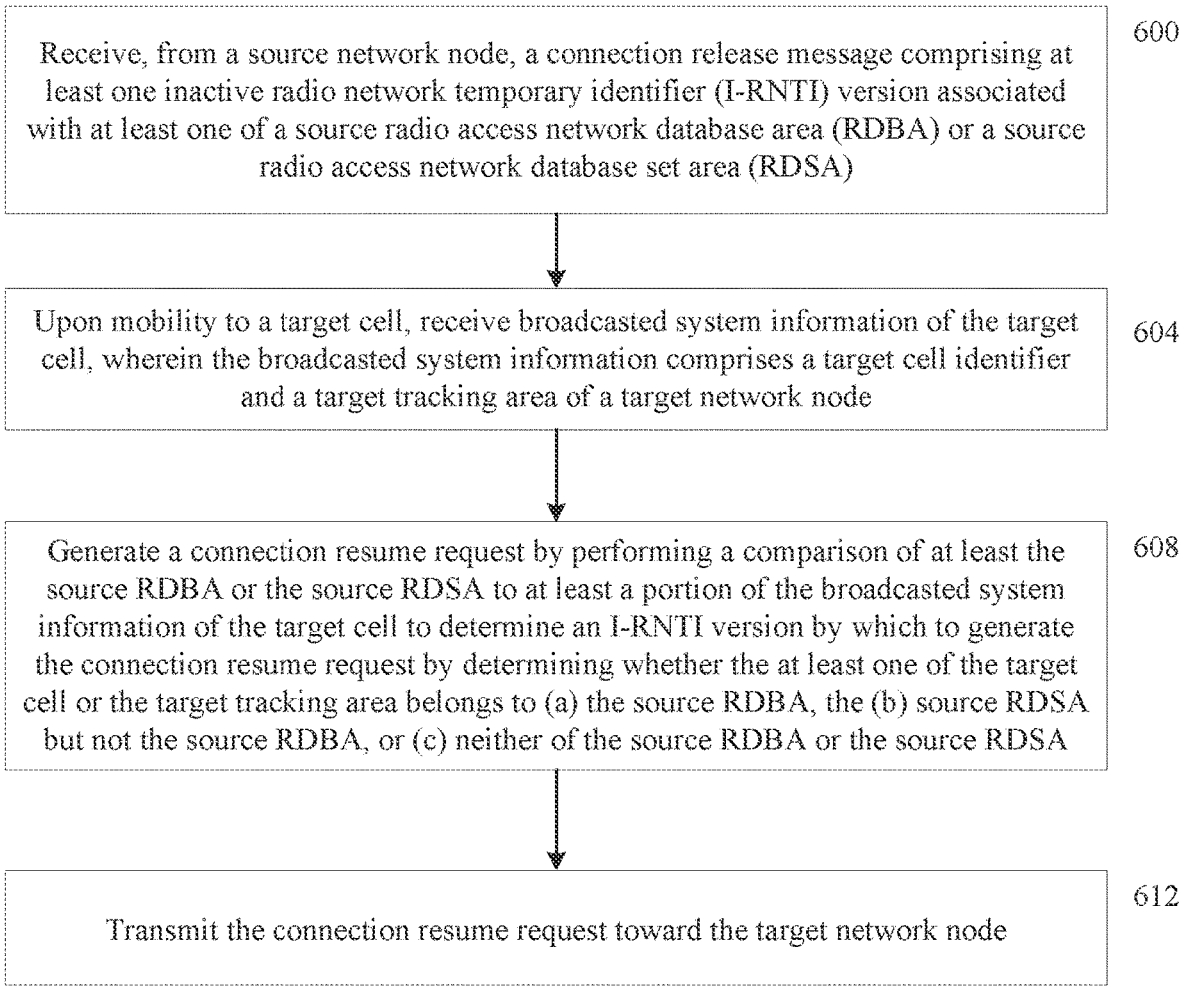
Figure 7:
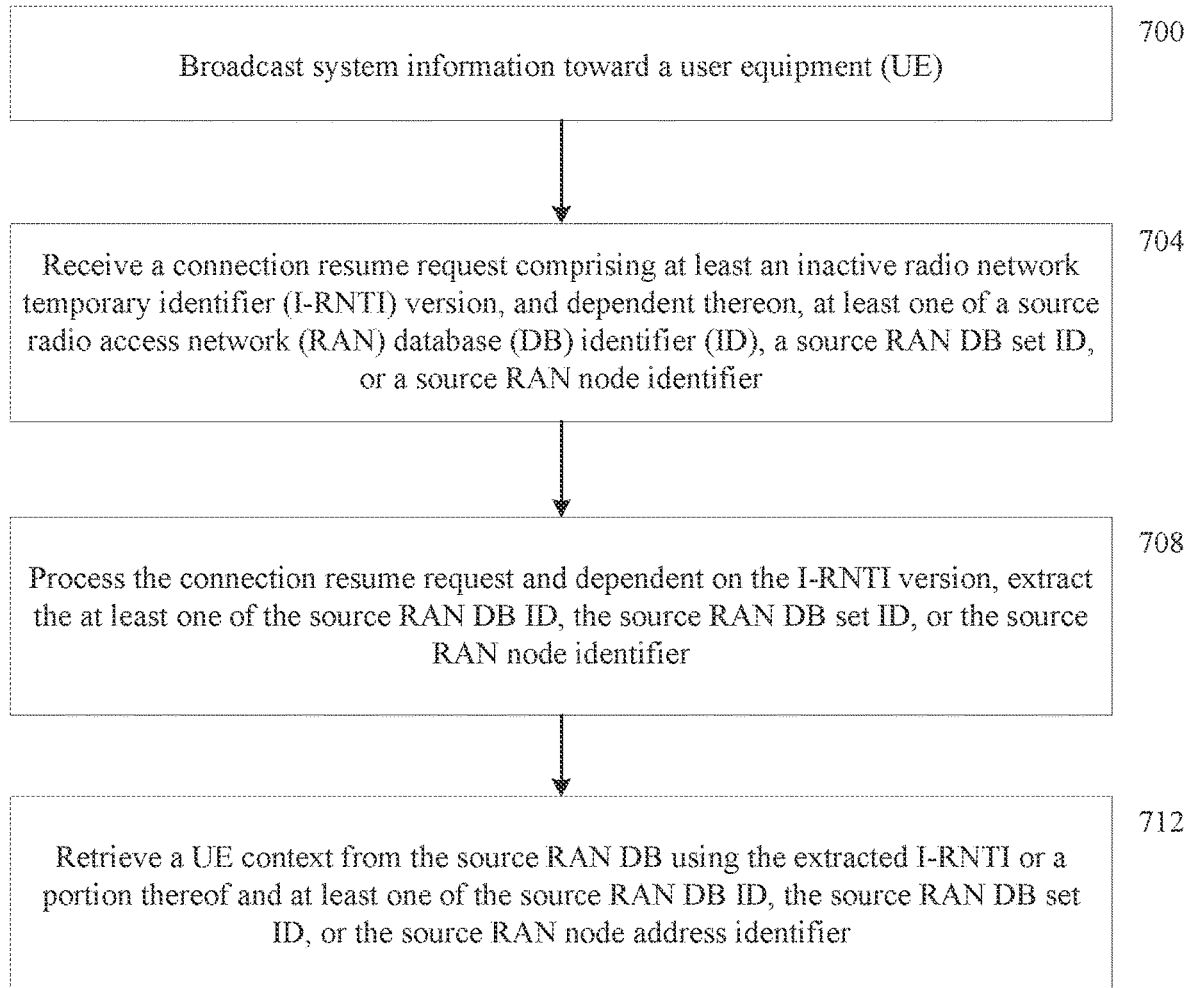
Figure 8:
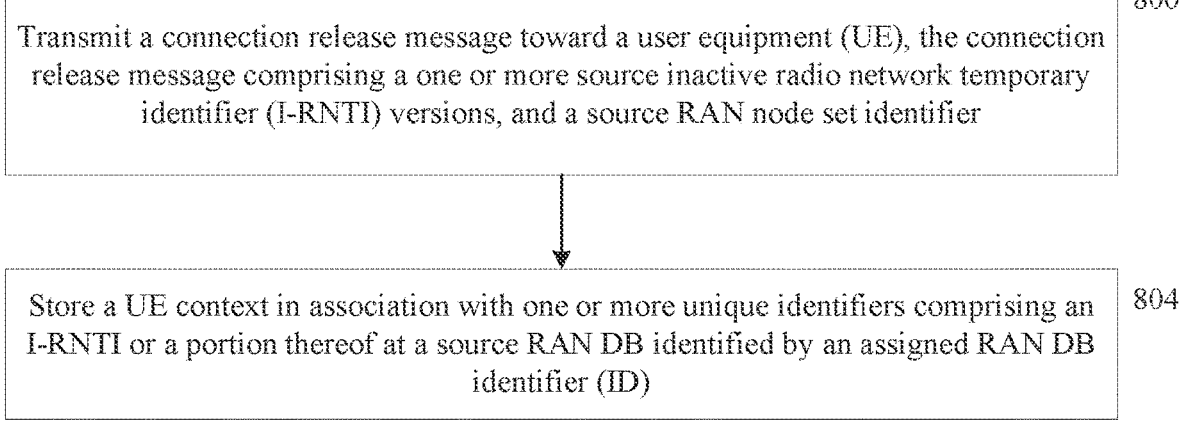
Figure 9:
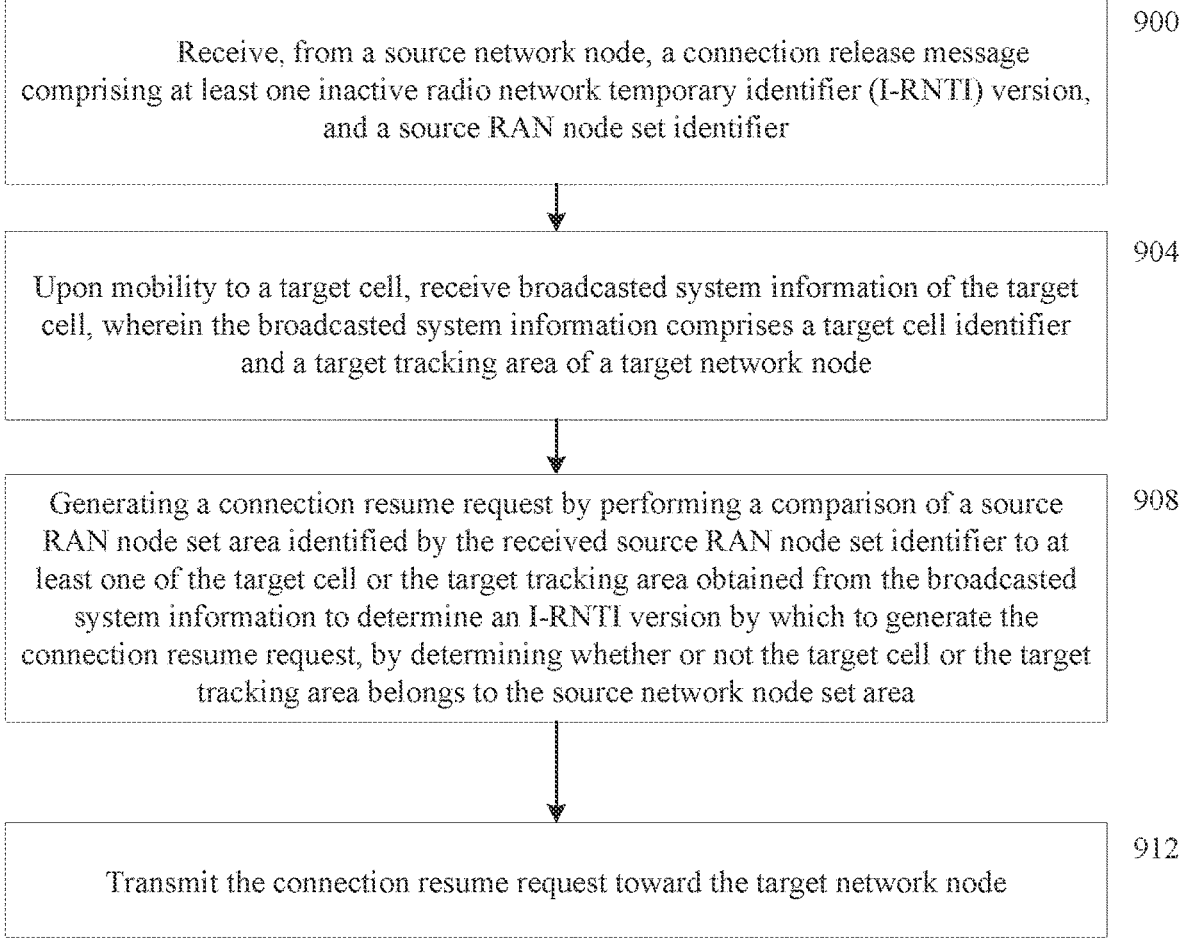
Figure 10:
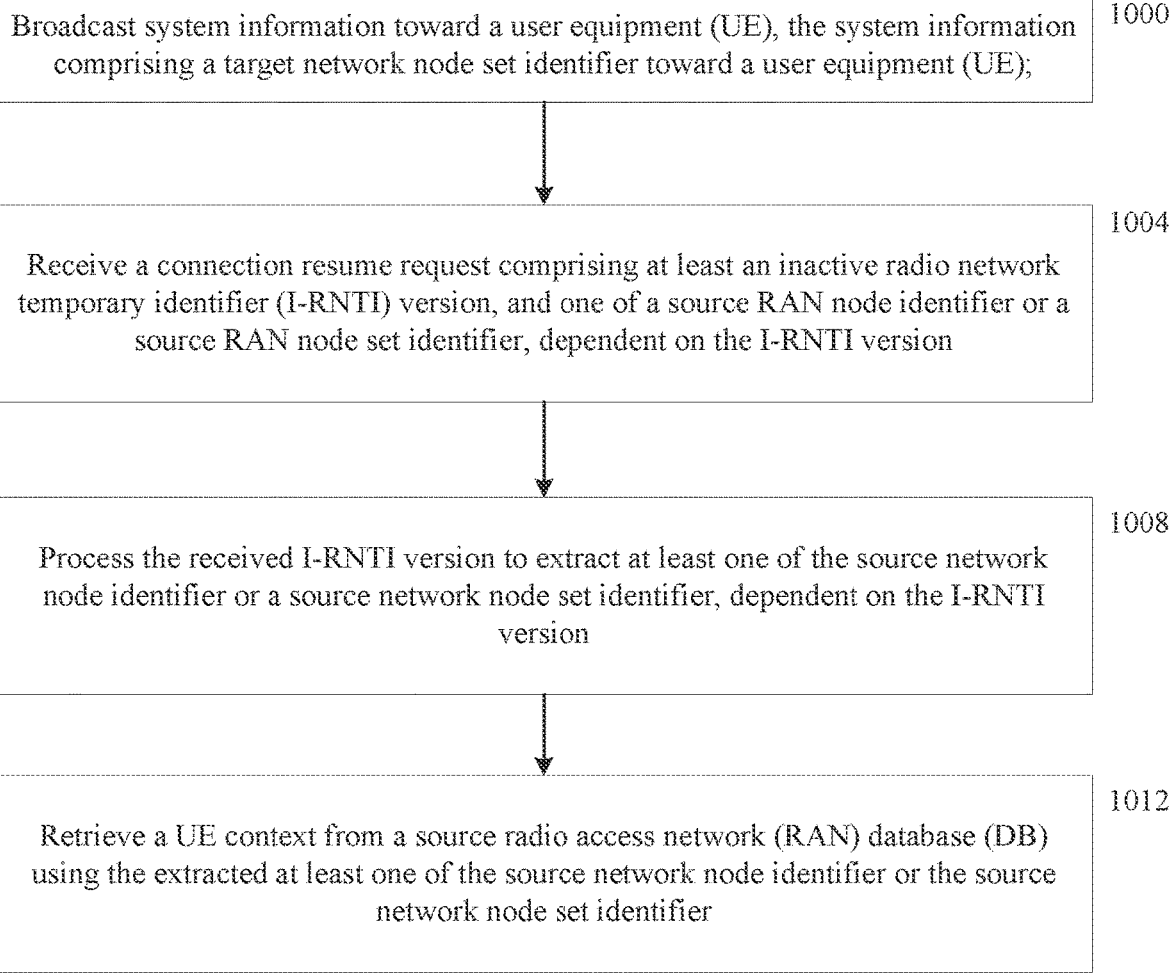

Having thus described certain example embodiments of the present disclosure in general terms, reference will hereinafter be made to the accompanying drawings, which are not necessarily drawn to scale, and wherein:

FIG. 1 is a schematic illustrating connection management states and radio resource control (RRC) states;

FIG. 2 is a schematic illustrating an example communication network within which example embodiments may be implemented;

FIG. 3 provides a message flow according to example embodiments;

FIG. 4 is a block diagram of an apparatus that may be specifically configured in accordance with an example embodiment of the present disclosure;

FIG. 5 is a flowchart of operations implemented by a source network node, according to certain example embodiments;

FIG. 6 is a flowchart of operations implemented by a user equipment (UE), according to certain example embodiments;

FIG. 7 is a flowchart of operations implemented by a target network node, according to certain example embodiments;

FIG. 8 is a flowchart of operations implemented by a source network node, according to certain example embodiments;

FIG. 9 is a flowchart of operations implemented by a user equipment (UE), according to certain example embodiments; and FIG. 10 is a flowchart of operations implemented by a target network node, according to certain example embodiments.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

The evolution of new communication technologies such as 5G and 6G have improved upon existing technologies such as 2G, 3G, 4G, LTE and has thus resulted in improved network connectivity. Example embodiments provided herein enable UE Context retrieval in RRC_INACTIVE state from a radio access network (RAN) database (DB) within a distributed DB architecture with improved efficiency and improved security. Example embodiments may reduce signaling posed on an Xn/X2 interface, provide more efficient addressing within current I-RNTI specifications, and provide backward compatibility and fallback mechanisms to the existing method for systems that do not implement the enhancements. Example embodiments further provide that potential non-standalone deployments could be also covered (6G and 5G), e.g., if introduced in 3GPP, and enable vendor differentiation based on the notion of RAN DB sets.

In certain embodiments provided herein including a first implementation that utilizes a RAN DB, the RAN DB identifiers are integrated within the I-RNTI. The gNB configures the UE with the I-RNTI as part of RRC Release message and the UE provides the I-RNTI when it returns towards the RRC Connected state or in case of small data transmission (SDT), depending on the system information block type 1 SIB1 message content. In further example embodiments, other system information types can also be utilized, e.g., on-demand system information. The target network node gNB determines the RAN DB identifier from I-RNTI and retrieves UE context.

RAN DB identifiers (ID) are proposed and described below and can be used for UE context retrieval as described herein. A RAN DB ID is used for identifying the RAN DB that stores and/or accesses the UE Context information. A RAN DB set ID is used for identifying a group of RAN DB s that are synchronized with each other thus the gNB can perform UE Context retrieval internally from any RAN DB belonging to the set.

Identifier configuration is performed during the RRC Connection Release procedure (by a source network node, gNB to a UE) as follows. Different I-RNTIs can be provided in the RRC Release message suspendConfig IE, integrating the RAN DB ID and RAN DB set ID, replacing the source network node, gNB, address in the current I-RNTI. One or multiple I-RNTIs can be configured to the UE, each I-RNTI corresponding to the usage in a given area. Full and short versions of each I-RNTI can be included as well.

The encoding mechanism or the addressing used for RAN DB ID and RAN DB set ID could be distinctly different from the encoding mechanism of source gNB address to enable identification and save or conserve I-RNTI bits to indicate whether the source entity address for the UE context is that of a gNB or a RAN DB.

For example, an I-RNTI according to a first I-RNTI version utilized in the first implementation utilizing RAN DB Area (RDBA) and/or RAN DB Set Area (RDSA) according to example embodiments provided herein, referred to herein as RNTI_v0, is defined as the UE ID+two-bit indicator for version 0 usage+source gNB ID. RNTI_v0 is used by the UE when the UE is outside both RAN DB Area and RAN DB Set Area, which is applicable in instances communication among RAN DB Sets is not enabled for vendor differentiation purposes.

An I-RNTI according to a second I-RNTI version utilized in the first implementation utilizing RDBA and/or RDSA according to example embodiments provided herein, referred to herein as I-RNTI_v1, is defined as UE ID+two-bit indicator for version 1 usage. I-RNTI_v1 is used by the UE when the UE is inside the RAN DB Area.

An I-RNTI according to a third I-RNTI version utilized in the first implementation utilizing RDBA and/or RDSA according to example embodiments provided herein, referred to herein as I-RNTI_v2, is defined as UE ID+two-bit indicator for version 2 usage+RAN DB ID+RAN DB Set ID. I-RNTI_v2 is used by the UE when the UE is outside the RAN DB Area, but inside the RAN DB Set Area or outside the RAN DB Set area, which is applicable in the case communication among RAN DB Sets is enabled.

The I-RNTI version to be used by the UE in RRC Resume is determined based on where the UE performs RRC Resume or SDT. RAN DB Area (RDBA) and RAN DB Set Area (RDSA) are defined for this purpose.

RDBA corresponds to a RAN DB within which the UE context is stored and UE shall send I-RNTI_v1 in RRC Resume Request message. RDBA is formed in a similar manner as RNA.

RDSA corresponds to a RAN DB set within which the UE shall send I-RNTI_v2 and outside of which the UE shall send I-RNTI_v0 in RRC Resume Request message. RDSA is formed in a similar manner as RNA.

RDBA and RDSA may be configured to a UE in the connection release message, such as inside suspendConfig message, and may be indicated by an identifier, or the connection release message may include the corresponding cell identifiers and/or target area identifiers. In this regard, RDBA and RDSA can be in the form of a list of tracking areas (TAs) or cell IDs served by the RAN DB (e.g., physical cell ID, PCI) that are provided to the UEs in the connection release message, such as the RRC Connection Release procedure. Additionally or alternatively, the RDBA and/or RDSA can be in the form of an identifier(s) that reference a list of tracking areas (TAs) or cell IDs served by the RAN DB (e.g., physical cell ID, PCI) that are provided to the UEs in the connection release message, such as the RRC Connection Release procedure.

In certain embodiments, RDBA and RDSA of the target network node can be broadcasted as system information, such as in the SIB1 of each cell, such as in a cellAccessRelatedInfo message, to enable the UE compare and find out which I-RNTI is to be used while performing RRC Resume. In further example embodiments, other system information types can also be utilized, e.g., on-demand system information.

The target network node gNB can in certain embodiments, directly contact the RAN DB or a RAN DB in the set to reduce latency and optimize signaling in instances. For example, the target network node, gNB has previously established a connection with the identified RAN DB after performing a search in its connection history, if available. Otherwise, the query can be done through a global DB by providing the unique key, such as an I-RNTI or UE ID within an I-RNTI.

A second implementation is provided, that utilizes a network node set ID. In certain embodiments, the first implementation utilizing RDBA and/or RDSA may be considered mutually exclusive from the second implementation utilizing the network node set ID, such that a network may be preset or preconfigured to utilize either implementation. The two implementations may differ in terms of their support in direct communication between RAN DB and a target gNB. In the second implementation utilizing the network node set ID, a direct communication is not supported, and thus, the UE context retrieval request goes through the source network node, gNB. In the first implementation, utilizing RDBA and/or RDSA, direct communication is supported and the UE context retrieval signaling can take place directly between the target network node gNB and RAN DB. Such direct or proxy-based communication selection can be based on the source network node gNB configuration.

In certain embodiments utilizing a network node set ID, such as a gNB set ID, the gNB identifiers are integrated within the I-RNTI. The gNB configures the UE with the I-RNTI as part of the connection release message and the UE provides the I-RNTI when it returns towards the RRC Connected state, or SDT, depending on the SIB1 message content. In certain example embodiments, other system information types can also be utilized, e.g., on-demand system information. The target network node gNB determines the network node set ID and/or network node identifier from the I-RNTI and retrieves the UE context. The network node set ID, or gNB set ID is used for identifying the set of network nodes that share the same RAN DB where the UE context information is stored. Note that gNB set ID may be configured to be the same as the gNB set ID in RIM.

It shall be noted that within the 6G system, different gNB sets may be introduced and, thus, there can be different set IDs used for different purposes.

Different I-RNTIs can be provided in RRCRelease message by the source gNB to UE in a suspendConfig IE or message, integrating the gNB set ID. One or multiple I-RNTIs can be configured to the UE. Full and short versions of each I-RNTI can be included as well.

The encoding mechanism or the addressing used for gNB set ID itself could be distinctly different from the encoding mechanism of source gNB address to enable identification and save I-RNTI bits to indicate whether the source address is that of a gNB or a gNB set.

According to certain embodiments, an I-RNTI according to I-RNTI_v1 is defined as the UE ID+one-bit indicator for version 1 usage+source gNB set ID.

According to certain embodiments, an I-RNTI according to I-RNTI_v0 is defined as the UE ID+one-bit indicator for version 0 usage+source gNB ID.

The I-RNTI version to be sent is determined based on RAN network node (gNB) group set area, referred to also as RGSA. RGSA is a group of gNB sets within which the UE shall send I-RNTI_v1 and outside of which the UE shall send I-RNTI_v0 in RRC Resume Request message. RGSA is formed in a similar manner as RNA.

RGSA is assigned to a UE in RRC Connection Release procedure inside suspendConfig and can be in the form of a list of tracking areas (TAs) or cell IDs (e.g., physical cell ID, PCI). Alternatively, RGSA shall be provided in SIB1 in the broadcasted system information such as cellAccessRelatedInfo. In certain example embodiments, other system information types can also be utilized, e.g., on-demand system information.

It will be appreciated that certain embodiments utilizing a RAN DB and certain embodiments utilizing a gNB set ID may be implemented independently of one another. In embodiments utilizing the gNB set ID, a direct communication between the target network node gNB and the RAN DB is not supported, and thus, the UE context retrieval request goes through the source gNB. In embodiments utilizing a RAN DB ID and RAN DB set ID, direct communication between the target network node gNB and the RAN DB is supported and the UE context retrieval signaling can take place directly between the target gNB and RAN DB. Such direct or proxy-based communication selection can be based on the source gNB configuration.

It will be appreciated that 3GPP does not specify which bits of I-RNTI should be used for each carried information in the I-RNTI and allows flexibility for each network implementation. According to example embodiments, the flexibility on the means for I-RNTI interpretation enables the use of existing mechanisms for RRC connection without RAN DB access in inter-vendor use cases.

FIG. 2 provides an example communication network within which example embodiments may be implemented. A RDBA 200 can be considered to include any number of RAN nodes, such as next generation network nodes (gNB) 210, each connected to a common RAN DB 212. An RAN-based notification area (RNA) 202 and/or RAN DB Set Area (RDSA) 204 may include one or more RDBAs 200. A UE 220 moving in the network may attempt connection with one or more gNBs 210. It will be appreciated that in certain embodiments, RDBA and/or RDSA can be configured to be the same as RNA. A similar concept applies to RGSA. It should also be noted that RNA 202 can be larger RDBA and/or RDSA. Additionally or alternatively, a network node such as gNB 210, which may include a source network node and/or target network node according to example embodiments, can be connected to one or more RAN DBs 212.

FIG. 3 is an example message flow that utilizes the first implementation according to example embodiments. As shown in operation 1 of FIG. 3, the UE context is stored at RAN DB once it is created with a UE ID (e.g. I-RNTI), described in further detail below.

As shown in operation 2 of FIG. 3, a connection release message such as RRC Connection Release message is sent, such as with suspendConfig to UE from a source gNB. The suspendConfig may be in the format of an I-RNTI, an indicator of the I-RNTI version, a UE identifier, and one or more source tracking areas or source cell identifiers that serve the RAN DB on which the UE context is stored, source RDBA, and/or source RDSA. The source RDBA and/or source RDSA may be optionally included in the connect release message, and may include the one or more source tracking areas or source cell identifiers transmitted. The source RDBA therefore comprises the RAN DB in which a UE context of the apparatus is stored, and the source RDSA comprises a RDBA set comprising one or more interconnected RAN DBs, one of which is the RAN DB in which the UE context of the apparatus is stored.

According to certain embodiments, example I-RNTI versions may be defined as follows, and distinguished from one another by a two-bit indicator in the I-RNTI. The versions may be predefined using any variation of bits, and the bits may occur in any predefined order, such that the following specifications are provided as examples. The bits used may vary dependent on network implementation and/or configuration.

For example, as described above, an I-RNTI according to a first I-RNTI version utilized in the first implementation, utilizing RDBA and/or RDSA, according to example embodiments provided herein, referred to herein as RNTI_v0, is defined as the UE ID+two-bit indicator for version 0 usage+source network node gNB ID.

An I-RNTI according to a second I-RNTI version utilized in the first implementation utilizing RDBA and/or RDSA according to example embodiments provided herein, referred to herein as I-RNTI_v1 is defined as UE ID+two-bit indicator for version 1 usage.

An I-RNTI according to a third I-RNTI version utilized in the first implementation utilizing RDBA and/or RDSA according to example embodiments provided herein, referred to herein as I-RNTI_v2 is defined as UE ID+two-bit indicator for version 2 usage+RAN DB ID+RAN DB Set ID. As described above, the RAN DB set, such as RAN DB set 304 depicted in FIG. 3 can include one or more RAN DB s 212.

The two-bit indicator indicates to the UE the remaining contents of the I-RNTI to enable the UE to communicate information regarding the location of its context, as described in further detail below.

As shown in operation 3 of FIG. 3, UE transitions to RRC_INACTIVE status. In operation 4 of FIG. 3, the UE moves to a target network node gNB.

As shown in operation 5 of FIG. 3, UE receives management information base (MIB)+system information block type 1 (SIB1) broadcast messages, such as but not limited to a cellAccessRelatedInfo message. In certain example embodiments, other system information types can also be utilized, e.g., on-demand system information. In certain embodiments, a target tracking area of the cell identifier can be obtained from the broadcasted system information. Additionally or alternatively, the broadcasted system information communicated by a target network node may optionally include a target RDBA and/or target RDSA information in cellAccessRelatedInfo.

As shown in operation 6 of FIG. 3, UE checks the broadcasted system information to select an I-RNTI version, dependent on its location relative to at least one of the source RDBA or the source RDSA.

According to the example I-RNTI versions provided above, the third I-RNTI version I-RNTI_v2 is used by the UE when the UE is outside the RAN DB Area, but inside the RAN DB Set Area or outside the RAN DB Set area (such as in instances in which communication among RAN DB Sets is enabled). I-RNTI_v2=UE ID+two-bit indicator for version 2 usage+RAN DB ID+RAN DB Set ID.

The second I-RNTI version I-RNTI_v1 is used by the UE when the UE is inside the RAN DB Area. I-RNTI_v1=UE ID+two-bit indicator for version 1 usage.

The first I-RNTI version I-RNTI_v0 is used by the UE when the UE is outside both RAN DB Area and RAN DB Set Area. I-RNTI_v0=UE ID+two-bit indicator for version 0 usage+source gNB ID. I-RNTI_v0 is applicable in cases in which communication among RAN DB Sets is not enabled, for vendor differentiation purposes, for example.

As shown in operation 7 of FIG. 3, UE sends RRCResumeRequest using the selected I-RNTI version.

As shown in operation 8 of FIG. 3, the target network node, or target gNB resolves the I-RNTI, and as shown in operation 9, based on the UE context location, the UE context is retrieved. In 9_1, the target network node gNB can contact its RAN DB that fetch the UE context from source RAN DB either directly or via broadcasting to RAN DB set or through Global DB, or the target network node gNB itself can directly send a request to source RAN DB. In 9_2, the target network node gNB can contact source gNB through X2/Xn interface for UE context transfer. The UE context is updated and stored at the target RAN DB and deleted from source RAN DB.

One example of an apparatus 400 that may be configured to function as a network entity, such as a UE, RAN node, and/or RAN DB, is provided in FIG. 4. The apparatus 400 includes, is associated with or is in communication with processing circuitry 302, a memory 406 and a communication interface 404. The processing circuitry 402 may be in communication with the memory device via a bus for passing information among components of the apparatus 400. The memory device 306 may be non-transitory and may include, for example, one or more volatile and/or non-volatile memories. In other words, for example, the memory device 306 may be an electronic storage device (e.g., a computer readable storage medium) comprising gates configured to store data (e.g., bits) that may be retrievable by a machine (e.g., a computing device like the processing circuitry). The memory device 306 may be configured to store information, data, content, applications, instructions, or the like for enabling the apparatus to carry out various functions in accordance with an example embodiment of the present disclosure. For example, the memory device 306 could be configured to buffer input data for processing by the processing circuitry 402. Additionally or alternatively, the memory device 306 could be configured to store instructions for execution by the processing circuitry 402.

The apparatus 400 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 402 may be embodied in a number of different ways. For example, the processing circuitry 402 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 402 may be configured to execute instructions stored in the memory device 306 or otherwise accessible to the processing circuitry 402. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. As another example, when the processing circuitry 402 is embodied as an executor of instructions, the instructions may specifically configure the processing circuitry and/or processor to perform the algorithms and/or operations described herein when the instructions are executed. However, in some cases, the processing circuitry 402 may be a processor of a specific device (e.g., an image or video processing system) configured to employ an embodiment of the present invention by further configuration of the processing circuitry by instructions for performing the algorithms and/or operations described herein. The processing circuitry 402 may include, among other things, a clock, an arithmetic logic unit (ALU) and logic gates configured to support operation of the processing circuitry.

The communication interface 404 may be any means such as a device or circuitry embodied in either hardware or a combination of hardware and software that is configured to receive and/or transmit data, including media content in the form of video or image files, one or more audio tracks or the like. In this regard, the communication interface 404 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Referring now to FIG. 5, an example flowchart implemented, for example, by an apparatus 400 embodied by a network entity, such as source network node (e.g., gNB) 300, will be discussed herein.

At block 500, the apparatus 400 embodied by a network entity, such as source network node (gNB 300), may include means, such as the processing circuitry 402, communication interface 404, or the like, for transmitting, and/or causing to transmit, a connection release message toward a user equipment (UE), the connection release message comprising one or more inactive radio network temporary identifier (I-RNTI) versions associated with at least one of a source radio access network database area (RDBA) or a source radio access network set area (RDSA) (e.g., RDBA and/or RDSA). See, for example, operation 2 of FIG. 3.

The connection release message may represent an RRC release and may include a suspendConfig message. The message populated by at least processing circuitry 402 may include any number of I-RNTIs, which may each include a version indicator to indicate how the remaining bits of the I-RNTI are utilized, as described herein. For example, I-RNTI_v2=UE ID+two-bit indicator for version 2 usage+RAN DB ID+RAN DB Set ID, I-RNTI_v1=UE ID+two-bit indicator for version 1 usage, and I-RNTI_v0=UE ID+two-bit indicator for version 0 usage+source RAN node identifier.

It will be appreciated that the data included in the connection release message with which the I-RNTI version is associated, may include an identifier of the source RDBA and/or source RDSA, or may include the source RDBA and/or source RDSA configured as source cell identifiers and/or source tracking areas.

The source RDBA may therefore include or refer to a radio access network (RAN) database (DB) in which a UE context is stored, and the source RDSA includes or refers to a RDBA set includes one or more RAN DB s one of which is the RAN DB in which the UE context of the apparatus is stored.

At block 504, the apparatus 400 embodied by a network entity, such as source network node (source gNB 300) and/or RAN DB 212, may include means, such as the processing circuitry 402, communication interface 404, memory 406 or the like, for storing the UE context in association with one or more unique identifiers comprising an I-RNTI or a portion thereof at a source RAN DB identified by an assigned RAN DB identifier (ID). See, for example, operation 1 of FIG. 3. In this regard, the source network node stores the UE context on the assigned RAN DB.

The RDBA and RDSA communicated toward the UE indicates the location of the stored UE context, to be further communicated by the UE to potential target network nodes, as described below.

FIG. 6 is a flowchart of operations that may be performed by an apparatus 400 embodied by a network entity, such as UE 220.

At block 600, the apparatus 400 embodied by a network entity, such as UE 220, may include means, such as the processing circuitry 402, communication interface 404, or the like, for receiving, from a source network node, a connection release message comprising at least one inactive radio network temporary identifier (I-RNTI) version associated with at least one of a source radio access network database area (RDBA) or a source radio access network database set area (RDSA) (e.g., RDBA and/or RDSA). See, for example operation 2 of FIG. 3.

The connection release message received by the UE 200 may represent an RRC release and may include a suspendConfig message. The message may include any number of I-RNTIs, which may each include a version indicator to indicate how the remaining bits of the I-RNTI are utilized, as described herein. For example, I-RNTI_v2=UE ID+two-bit indicator for version 2 usage+RAN DB ID+RAN DB Set ID, I-RNTI_v1=UE ID+two-bit indicator for version 1 usage, and I-RNTI_v0=UE ID+two-bit indicator for version 0 usage+source RAN node ID.

It will be appreciated that the data included in the connection release message with which the I-RNTI version is associated, may include an identifier of the source RDBA and/or source RDSA, or may include the source RDBA and/or source RDSA configured as source cell identifiers and/or source tracking areas.

The source RDBA received in or referenced by the connection release message comprises a radio access network (RAN) database (DB) in which a UE context of the apparatus is stored, and the source RDSA comprises a RDBA set includes one or more RAN DBs one of which is the RAN DB in which the UE context of the apparatus is stored.

At block 604, the apparatus 400 embodied by a network entity, such as UE 220, may include means, such as the processing circuitry 402, communication interface 404, or the like, for receiving, upon mobility to a target cell, broadcasted system information of the target cell, wherein the broadcasted system information comprises a target cell identifier and a target tracking area of a target network node, such as gNB.

As indicated in operation 5 of FIG. 3, the broadcasted system information may include management information base (MIB)+system information block type 1 (SIB1). In certain example embodiments, other system information types can also be utilized, e.g., on-demand system information.

At block 608, the apparatus 400 embodied by a network entity, such as UE 220, may include means, such as the processing circuitry 402, or the like, for generating a connection resume request by performing a comparison of at least the source RDBA or the source RDSA to at least a portion of the broadcasted system information of the target cell to determine an I-RNTI version by which to generate the connection resume request by determining whether the at least one of the target cell or the target tracking area belongs to (a) the source RDBA, the (b) source RDSA but not the source RDBA, or (c) neither of the source RDBA or the source RDSA.

In this regard, the at least one of a target tracking area or a cell identifier may be obtained from the broadcasted system information provided by the target (e.g., in MIB+SIB1). In certain embodiments, the target network node may provide the RDBA and/or RDSA. The comparison is indicative of the UE's location relative to the source network node (e.g., source RDBA and/or source RDSA), such that the UE provides an I-RNTI using a version indicating information that can be used by the target network node to efficiently retrieve the UE context.

Performing the comparison of operation 608 may therefore include determining whether the at least one of the target cell or the target tracking area are included in the one or more source tracking areas or the one or more source cell identifiers received or referenced in the connection release message.

The connection resume request includes the determined one or more I-RNTI versions and at least one of the source RDBA, the source RDSA, or an identifier of the source network node, dependent on the determined one or more I-RNTI versions (e.g., I-RNTI_v0, I-RNTI_v1, I-RNTI_v2).

In this regard, at block 612, the apparatus 400 embodied by a network entity, such as UE 220, may include means, such as the processing circuitry 402, communication interface 404, or the like, for transmitting, and/or causing to transmit, the connection resume request toward the target network node.

FIG. 7 is a flowchart of operations that may be performed by an apparatus 400 embodied by a network entity, such as target network node (gNB) 310.

At block 700, the apparatus 400 embodied by a network entity, such as target network node (gNB) 310, may include means, such as the processing circuitry 402, communication interface 404, or the like, for broadcasting system information toward a user equipment (UE)). For example, see operation 5 of FIG. 3, in which the broadcasted system information may be transmitted via a include management information base (MIB)+system information block type 1 (SIB1) message. In certain example embodiments, other system information types can also be utilized, e.g., on-demand system information. The broadcasted system information may be provided as cellAccessRelatedInfo and may optionally include RDBA and/or RDSA.

At block 704, the apparatus 400 embodied by a network entity, such as target network node (gNB) 310, may include means, such as the processing circuitry 402, communication interface 404, or the like, for receiving a connection resume request comprising at least an inactive radio network temporary identifier (I-RNTI) version, and dependent thereon, at least one of a source radio access network (RAN) database (DB) identifier (ID), a source RAN DB set ID, or a source RAN node identifier (e.g., address of the source network node). The connection resume request may be received from the UE 220 as a RRC Resume Request and includes an I-RNTI message according to the specification for the version indicated in the designated position of the I-RNTI (e.g., I-RNTI_v0, I-RNTI_v1, I-RNTI_v2 described herein).

At block 708, the apparatus 400 embodied by a network entity, such as target network node (gNB) 310, may include means, such as the processing circuitry 402, or the like, for processing the connection resume request and dependent on the I-RNTI version, extract the at least one of the source RAN DB ID, the source RAN DB set ID, or the source RAN node identifier. See at least operation 8 of FIG. 3.

At block 712, the apparatus 400 embodied by a network entity, such as target network node (gNB) 310, may include means, such as the processing circuitry 402, communication interface 404, or the like, for retrieving a UE context from the source RAN DB using the extracted I-RNTI or a portion thereof and at least one of the source RAN DB ID, the source RAN DB set ID, or the source network node address identifier. See at least operations 9_1 and 9_2 of FIG. 3.

In certain embodiments, the UE context is retrieved via broadcasting to a RAN DB set identified by the source RAN DB set ID, or the UE context may be retrieved via a global database. For example, in an absence of a direct communication interface between a target RDBA and source RAN DB s identified by the source RAN DB set ID, the UE context is retrieved via a global database via a direct or peer-to-peer interface to the said global database. In certain embodiments, the UE context is retrieved via a direct interface to a RAN DB identified by the source RAN DB ID. In certain embodiments, the UE context is retrieved via a peer-to-peer interface through a source network node identified by the source RAN node identifier.

While FIGS. 3 and 5-7 provide example operations performed according to a first implementation utilizing RDBA and RDSA, a second but similar second implementation may be performed utilizing a source RAN node identifier and/or source RAN node set identifier.

FIG. 8 is a flowchart of operations that may be performed, for example, by an apparatus 400 embodied by a network entity, such as source network node (e.g., gNB) 300. In block 800, the apparatus 400 embodied by a network entity, such as source network node (e.g., gNB) 300, may include means, such as the processing circuitry 402, communication interface 404, or the like, for transmitting, and/or causing to transmit, a connection release message toward a user equipment (UE), the connection release message comprising a one or more source inactive radio network temporary identifier (I-RNTI) versions, and a source RAN node set identifier.

As set forth herein, example versions in the second implementation utilizing the network node set ID may include a first version, referred to herein as I-RNTI_v0, where I-RNTI_v0=UE ID+one-bit indicator for version 0 usage+source gNB ID. A second version is referred to herein as I-RNTI_v1, where I-RNTI_v1=UE ID+one-bit indicator for version 1 usage+source gNB set ID.

In block 804, the apparatus 400 embodied by a network entity, such as source network node (e.g., gNB) 300, may include means, such as the processing circuitry 402, communication interface 404, memory 406, or the like, for storing a UE context in association with one or more unique identifiers comprising an I-RNTI or a portion thereof at a source RAN DB identified by an assigned RAN DB identifier (ID). See at least operation 1 of FIG. 3.

FIG. 9 is a flowchart of operations that may be performed, for example, by an apparatus 400 embodied by a network entity, such as UE 200, when implementing the configuration utilizing a source node set ID, such as a gNB set ID. In operation 900, the apparatus 400 embodied by a network entity, such as UE 200, may include means, such as the processing circuitry 402, communication interface 404, or the like, for receiving, from a source network node, a connection release message comprising at least one inactive radio network temporary identifier (I-RNTI) version associated with a source RAN node set identifier. The I-RNTI version indicates to the UE which type of data identifying the source is provided in the message. For example, a first version I-RNTI_v0 may indicate the source network node (gNB) ID is provided, and the second version I-RNTI_v1 may indicate the source network node (gNB) set ID is provided. In certain embodiments the source RAN node set identifier is included in the connection release message such that the communication interface 404 receives the source RAN node set identifier from the source network node.

In operation 904, the apparatus 400 embodied by a network entity, such as UE 200, may include means, such as the processing circuitry 402, communication interface 404, or the like, for, receiving, upon mobility to a target cell, broadcasted system information of the target cell, wherein the broadcasted system information comprises a target cell identifier and a target tracking area of a target network node. In certain embodiments the broadcasted system information optionally includes the target network node set identifier, from which the target tracking area or a cell identifier can be obtained. The at least one of a target tracking area or the target cell is included in the target network node set identified by the target network node set identifier.

In operation 908, the apparatus 400 embodied by a network entity, such as UE 200, may include means, such as the processing circuitry 402, or the like, for generating a connection resume request by performing a comparison of a source network node set area identified by the received source RAN node set identifier to at least one of the target cell or the target tracking area obtained from the broadcasted system information to determine an I-RNTI version by which to generate the connection resume request, by determining whether or not the target cell or the target tracking area belongs to the source network node set area. The source network node set area may include one or more sources areas or source cell identifiers. In this regard the UE uses the information from the broadcasted system information to determine what information is needed by the target network node to retrieve the UE context, according to the network node set area. The connection resume request comprises the determined one or more I-RNTI version, and dependent thereon, at least one of the source RAN node identifier or the source RAN node set identifier. It will be appreciated that according to operation 908, the connection resume request is generated based at least in part on the received I-RNTI version.

If the target cell or target area does not belong to the source network node set area, a first version such as I-RNTI_v0 may be used, configured for use in the connection resume request when the apparatus is outside the source network node set area identified by the source RAN node set identifier. In the first version such as I-RNTI_v0, the I-RNTI further comprises the source RAN node identifier.

If the target cell or target area belongs to the source network node set area, a second version such as I-RNTI_v1 may be used, configured for use in the connection resume request when the apparatus is inside the source network node set area identified by the source RAN node set identifier. In the second version such as I-RNTI_v1, the I-RNTI further comprises the source RAN node set identifier.

In this regard, the I-RNTI version is determined dependent on a location of the apparatus relative to a source network node set identified by the source RAN node set identifier.

In operation 912, the apparatus 400 embodied by a network entity, such as UE 200, may include means, such as the processing circuitry 402, communication interface 404, or the like, for transmitting, and/or causing to transmit, the connection resume request toward the target network node.

FIG. 10 is a flowchart of operations that may be performed by an apparatus 400 embodied by a network entity, such as target network node (gNB) 310, when implementing the configuration utilizing a source RAN node set identifier, such as a source gNB set ID.

In operation 1000, the apparatus 400 embodied by a network entity, such as target network node (gNB) 310, may include means, such as the processing circuitry 402, communication interface 404, or the like, for broadcasting system information toward a user equipment (UE), the system information comprising a target network node set identifier toward a user equipment (UE).

In operation 1004, the apparatus 400 embodied by a network entity, such as target network node (gNB) 310, may include means, such as the processing circuitry 402, communication interface 404, or the like, for receiving receive a connection resume request comprising at least an inactive radio network temporary identifier (I-RNTI) version, and one of a source RAN node identifier or a source RAN node set identifier, dependent on the I-RNTI version. In this regard, the contents of the I-RNTI depends on the one-bit indicator of the I-RNTI version provided by the UE.

In operation 1008, the apparatus 400 embodied by a network entity, such as target network node (gNB) 310, may include means, such as the processing circuitry 402 or the like, for processing the received I-RNTI version to extract at least one of the source RAN node identifier or a source RAN node set identifier, dependent on the I-RNTI version.

In operation 1012, the apparatus 400 embodied by a network entity, such as target network node (gNB) 310, may include means, such as the processing circuitry 402, communication interface 404, or the like, for retrieving a UE context from a source radio access network (RAN) database (DB) using the extracted at least one of the source RAN node identifier or the source RAN node set identifier.

It will be appreciated that in the second implementation utilizing the source RAN node set identifier, such as those described with reference to FIGS. 8-10, a direct communication between RAN DB and a target network node (gNB) is not supported, and thus, the UE context retrieval request goes through the source network node gNB. In certain embodiments, the UE context is retrieved via broadcasting to a source network node set identified by the source RAN node set identifier. In certain embodiments, the UE context is retrieved via a direct interface to a global database. Additionally or alternatively, the UE context is retrieved via a peer-to-peer interface through a source network node identified by the source RAN node identifier.

Example embodiments according to the first and second implementations provided herein enable UE context retrieval while reducing the signaling otherwise posed on Xn/X2 interfaces without the advantages of the disclosed embodiments. Example embodiments further provide more efficient addressing within the current I-RNTI specification, which is desirable for reliable reception and improved I-RNTI resolving.

Example embodiments further enable backward compatibility and a fallback mechanism to the existing method for systems that do not support the enhancements. Accordingly, potential non-standalone deployments could be also covered (6G-5G), if introduced in 3GPP. Example embodiments further ensure vendor differentiation based on the notion of RAN DB sets.

FIGS. 3 and 5-10 illustrate message flows and flow charts depicting methods according to an example embodiment of the present invention. It will be understood that each block of the message flow may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 306 of an apparatus 300 employing an embodiment of the present invention and executed by a processor 302. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts and message flows support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although a few variations have been described in detail above, other modifications or additions are possible. In particular, further features and/or variations may be provided in addition to those set forth herein. Moreover, the implementations described above may be directed to various combinations and sub-combinations of the disclosed features and/or combinations and sub-combinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

It should therefore again be emphasized that the various embodiments described herein are presented by way of illustrative example only and should not be construed as limiting the scope of the claims. For example, alternative embodiments can utilize different communication system configurations, user equipment configurations, base station configurations, identity request processes, messaging protocols and message formats than those described above in the context of the illustrative embodiments. These and numerous other alternative embodiments within the scope of the appended claims will be readily apparent to those skilled in the art.

What is claimed is:

1. An apparatus comprising:
   at least one processor; and
   at least one memory including program code,
   the at least one memory and the program code being configured to, with the at least one processor, cause the apparatus to at least:
   receive, from a source network node, a connection release message comprising at least one inactive radio network temporary identifier (I-RNTI) version associated with at least one of a source radio access network database area (RDBA) or a source radio access network database set area (RDSA); and
   generate a connection resume request based on the received I-RNTI version,
   wherein the source RDBA comprises a radio access network (RAN) database in which a user equipment context of the apparatus is stored, and the source RDSA comprises a RDBA set comprising one or more inter-connected radio access network (RAN) databases, one of which is the RAN database in which the user equipment context of the apparatus is stored.

2. The apparatus according to claim 1, wherein the at least one memory and the program code are further configured to, with the at least one processor, cause the apparatus to at least:
   receive, from the source network node, the at least one of the source RDBA or the source RDSA, wherein generating the connection resume request is further based on the received at least one of the source RDBA or the source RDSA.

3. The apparatus according to claim 1, wherein the at least one memory and the program code are further configured to, with the at least one processor, cause the apparatus to at least:
   upon mobility to a target cell, receive broadcasted system information of the target cell, wherein the broadcasted system information comprises a target cell identifier and a target tracking area of a target network node; and
   wherein generating of the connection resume request comprises:
   performing a comparison of at least one of the source RDBA or the source RDSA to at least a portion of the broadcasted system information of the target cell or the target tracking area to determine an I-RNTI version by which to generate the connection resume request by determining whether at least one of the target cell or the target tracking area belongs to (a)

the source RDBA, the (b) source RDSA but not the source RDBA, or (c) neither of the source RDBA or the source RDSA.

4. The apparatus according to claim 3, wherein the connection resume request comprises the determined I-RNTI version, and dependent thereon, at least one of the source RDBA, the source RDSA, or an identifier of the source network node.

5. The apparatus according to claim 3, wherein the portion of the broadcasted system information of the target cell or the target tracking area to which the at least one of the source RDBA or the source RDSA is compared comprises at least one of a target RDBA or a target RDSA.

6. The apparatus according to claim 3, wherein the at least one memory and the program code are configured to, with the at least one processor, cause the apparatus to at least:
transmit the connection resume request comprising the determined I-RNTI toward the target network node.

7. The apparatus according to claim 3, wherein the at least one of the source RDBA or the source RDSA comprise at least one of one or more source tracking areas or one or more source cell identifiers that serve the source RDBA and the source RDSA, and wherein performing the comparison comprises determining whether at least one of the target cell or the target tracking area is included in the one or more source tracking areas or the one or more source cell identifiers received or referenced in the connection release message.

8. The apparatus according to claim 3, wherein the determined I-RNTI version is determined from a plurality of I-RNTI versions comprising at least a first I-RNTI version configured for use in the connection resume request when the apparatus is outside both the RDBA and the RDSA.

9. The apparatus according to claim 3, wherein the determined I-RNTI version is determined from a plurality of I-RNTI versions comprising at least a second I-RNTI version configured for use in the connection resume request when the apparatus is inside the RDBA.

10. The apparatus according to claim 3, wherein the determined I-RNTI version is determined from a plurality of I-RNTI versions comprising at least a third I-RNTI version configured for use in the connection resume request when the apparatus is outside the source RDBA and inside or outside the source RDSA.

11. The apparatus according to claim 3, wherein the target network node is connected to one or more radio access network (RAN) databases.

12. The apparatus according to claim 1, wherein the source network node is connected to one or more radio access network (RAN) databases.

13. The apparatus according to claim 1, wherein each of the at least one I-RNTI version comprises a user equipment identifier and at least a two-bit indicator to indicate I-RNTI version usage.

14. The apparatus according to claim 1, wherein the at least one I-RNTI version to be used in a connection resume request is determined dependent on a location of the apparatus relative to the at least one of the source RDBA or the source RDSA.

15. An apparatus comprising:
at least one processor; and
at least one memory including program code, the at least one memory and the program code being configured to, with the at least one processor, cause the apparatus to at least:
transmit a connection release message toward a user equipment, the connection release message comprising at least one inactive radio network temporary identifier (I-RNTI) version associated with at least one of a source radio access network database area (RDBA) or a source radio access network set area (RDSA), to enable the user equipment to generate a connection resume request based on the I-RNTI version,
wherein the source RDBA comprises a radio access network (RAN) database in which a user equipment context is stored, and the source RDSA comprises a RDBA set comprising one or more inter-connected radio access network (RAN) databases, one of which is the RAN database in which the user equipment context is stored.

16. The apparatus according to claim 15, wherein the at least one memory and the program code are further configured to, with the at least one processor, cause the apparatus to at least:
store the user equipment context in association with at least one unique identifier comprising an I-RNTI or a portion thereof in a source radio access network database identified by an assigned radio access network database identifier.

17. An apparatus comprising:
at least one processor; and
at least one memory including program code, the at least one memory and the program code being configured to, with the at least one processor, cause the apparatus to at least:
broadcast system information of a target cell towards a user equipment, wherein the broadcast system information comprises a target cell identifier or a target tracking area of the apparatus; and
receive, from the user equipment, a connection resume request where the connection resume request is based on the broadcast system information and at least an inactive radio network temporary identifier (I-RNTI) version associated with at least one of a source radio access network database area (RDBA) or a source radio access network database set area (RDSA),
wherein the source RDBA comprises a radio access network (RAN) database in which a user equipment context of the user equipment is stored, and the source RDSA comprises a RDBA set comprising one or more inter-connected radio access network (RAN) databases, one of which is the RAN database in which the user equipment context of the user equipment is stored.

18. The apparatus according to claim 17, wherein the at least one memory and the program code are further configured to, with the at least one processor, cause the apparatus to at least:
process the connection resume request and, dependent on the I-RNTI version, extract at least one of the source RAN database identifier, the source RAN database set identifier, or the source RAN node identifier.

19. The apparatus according to claim 18, wherein the at least one memory and the program code are further configured to, with the at least one processor, cause the apparatus to at least: retrieve a user equipment context from the source RAN database using the extracted I-RNTI or a portion thereof and at least one of the source RAN database identifier, the source RAN database set identifier, or the source RAN node identifier.

20. A method comprising:
  receiving, from a source network node, a connection release message comprising at least one inactive radio network temporary identifier (I-RNTI) version associated with at least one of a source radio access network database area (RDBA) or a source radio access network database set area (RDSA); and
  generating a connection resume request based on the received I-RNTI version,
  wherein the source RDBA comprises a radio access network (RAN) database in which a user equipment context of the apparatus is stored, and the source RDSA comprises a RDBA set comprising one or more interconnected radio access network (RAN) databases, one of which is the RAN database in which the user equipment context of the apparatus is stored.

* * * * *